US011109440B2

(12) United States Patent
Haartsen

(10) Patent No.: US 11,109,440 B2
(45) Date of Patent: Aug. 31, 2021

(54) DISCONTINUOUS TRANSMISSION ON SHORT-RANGE PACKET-BASED RADIO LINKS

(71) Applicant: Plantronics, Inc., Santa Cruz, CA (US)

(72) Inventor: Jacobus Cornelis Haartsen, Rolde (NL)

(73) Assignee: Plantronics, Inc., Santa Cruz, CA (US)

( * ) Notice: Subject to any disclaimer, the term of this patent is extended or adjusted under 35 U.S.C. 154(b) by 247 days.

(21) Appl. No.: 16/179,747

(22) Filed: Nov. 2, 2018

(65) Prior Publication Data

US 2020/0146097 A1 May 7, 2020

(51) Int. Cl.
*G10L 25/93* (2013.01)
*G10L 25/78* (2013.01)
(Continued)

(52) U.S. Cl.
CPC ........... *H04W 76/28* (2018.02); *G10L 19/167* (2013.01); *G10L 25/84* (2013.01); *H04L 1/188* (2013.01);
(Continued)

(58) Field of Classification Search
CPC ... G10L 19/167; G10L 19/012; G10L 19/005; G10L 25/78; H04W 76/28; H04W 4/80; H04M 2250/02
See application file for complete search history.

(56) References Cited

U.S. PATENT DOCUMENTS

| 6,671,292 | B1 * | 12/2003 | Haartsen | H04J 3/0632 370/412 |
| 8,498,678 | B2 * | 7/2013 | Tsfaty | H04W 52/028 455/574 |

(Continued)

FOREIGN PATENT DOCUMENTS

EP           2552172 A1     1/2013

OTHER PUBLICATIONS

Zurbes, "Considerations on link and system throughput of Bluetooth networks.", 2000, 11th IEEE International Symposium on Personal Indoorand Mobile Radio Communications. PIMRC 2000. Proceedings (Cat. No. 00TH8525). vol. 2. IEEE, 2000, pp. 1315-1319.*

(Continued)

*Primary Examiner* — Olujimi A Adesanya
(74) *Attorney, Agent, or Firm* — Ferguson Braswell Fraser Kubasta PC

(57) ABSTRACT

Described herein are systems and methods for discontinuous transmission on short-range packet-based radio links. As one option, during a communication session with a far-end system on a short-range packet-based radio link, an audio stream received on an audio line in is monitored for voice-based signals. Based on monitoring the audio stream for the voice-based signals, a voice activity estimation signal is generated. While the voice activity estimation signal exceeds a predetermined threshold, one or more voice packets are generated based on the audio stream, and transmitted to the far-end system at one or more times. Also, in (Continued)

response to determining that the voice activity estimation signal is below the predetermined threshold, one or more zero-payload packets are transmitted to the far-end system at one or more subsequent times.

17 Claims, 14 Drawing Sheets

(51) Int. Cl.
*H04W 76/28* (2018.01)
*G10L 19/16* (2013.01)
*G10L 25/84* (2013.01)
*H04L 1/18* (2006.01)
*H04W 52/02* (2009.01)

(52) U.S. Cl.
CPC ... *H04W 52/0254* (2013.01); *G10L 2025/786* (2013.01)

(56) References Cited

U.S. PATENT DOCUMENTS

| | | | |
|---|---|---|---|
| 9,485,686 B2* | 11/2016 | Gundu | H04L 65/4061 |
| 9,775,110 B2 | 9/2017 | Vallath et al. | |
| 9,907,023 B1* | 2/2018 | HomChaudhuri | H04W 52/0261 |
| 10,034,160 B2* | 7/2018 | Song | H04L 1/1877 |
| 10,784,993 B1* | 9/2020 | Batra | H04L 1/0047 |
| 2004/0184443 A1* | 9/2004 | Lee | G10L 19/005 370/352 |
| 2004/0242258 A1* | 12/2004 | Kim | H04B 17/318 455/522 |
| 2005/0020299 A1 | 1/2005 | Malone et al. | |
| 2006/0193269 A1* | 8/2006 | Perraud | H04M 1/6066 370/278 |
| 2006/0293885 A1* | 12/2006 | Gournay | G10L 19/012 704/223 |
| 2009/0017879 A1 | 1/2009 | Yossi et al. | |
| 2009/0063165 A1* | 3/2009 | Ojala | G10L 19/012 704/500 |
| 2014/0162555 A1* | 6/2014 | Wernaers | H04W 76/28 455/41.2 |
| 2014/0348327 A1* | 11/2014 | Linde | H04H 20/88 381/2 |
| 2017/0070615 A1* | 3/2017 | Cartright | H04M 3/568 |
| 2018/0084569 A1* | 3/2018 | Li | H04W 72/0446 |
| 2018/0084606 A1* | 3/2018 | Li | H04W 72/085 |
| 2018/0176713 A1* | 6/2018 | Linsky | H04M 1/6033 |

OTHER PUBLICATIONS

Jeong et al "Performance analysis of voice and data transmission over Bluetooth radio link", 2004, IEICE transactions on communications. Apr. 1, 2004;87(4):918-25.*

Feng et al, "Analysis of low energy consumption wireless sensor with BLE", 2015, In2015 IEEE Sensors Nov. 1, 2015 (pp. 1-4).*

International Search Report and Written Opinion issued for International Application No. PCT/US2019/059454 dated Apr. 9, 2020, 18 pages.

Mathew et al., "IEEE 802.11 & Bluetooth Interference: Simulation and Coexistence," In *2009 Seventh Annual Communication Networks and Services Research Conference*, pp. 217-223. IEEE, 2009.

* cited by examiner

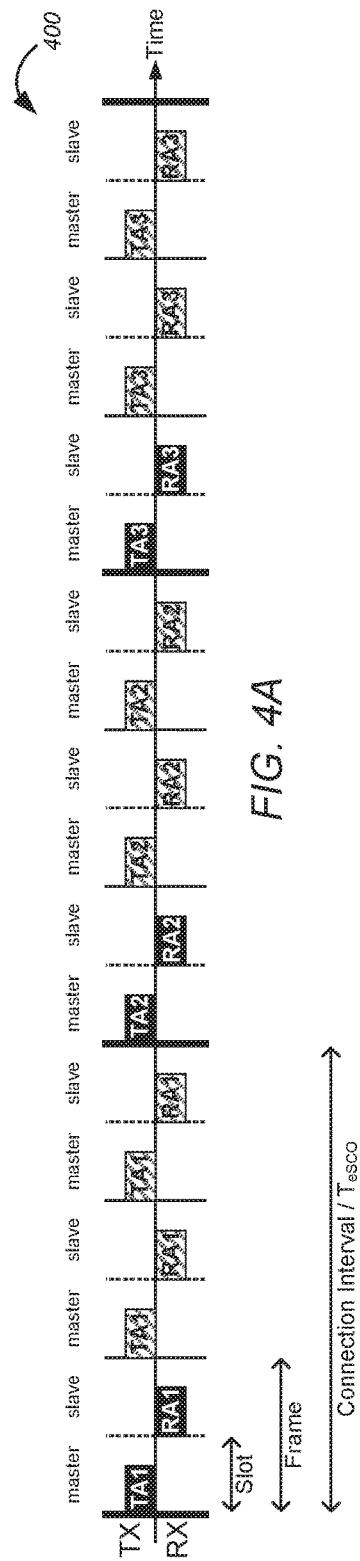
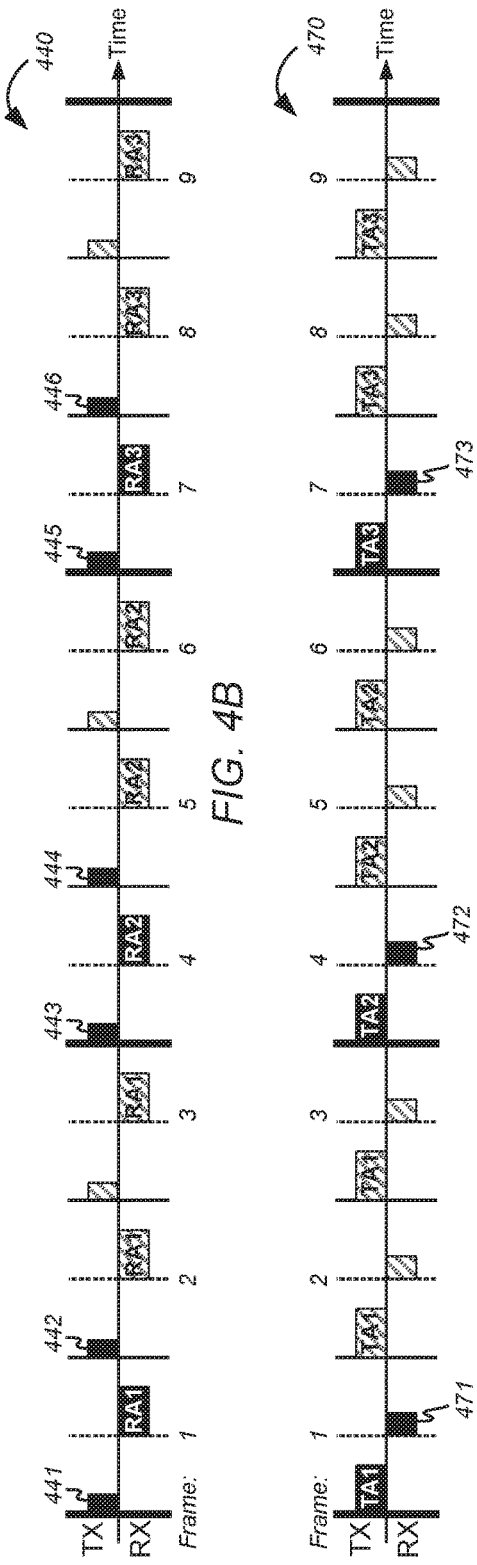
FIG. 4A
FIG. 4B
FIG. 4C
FIG. 4D

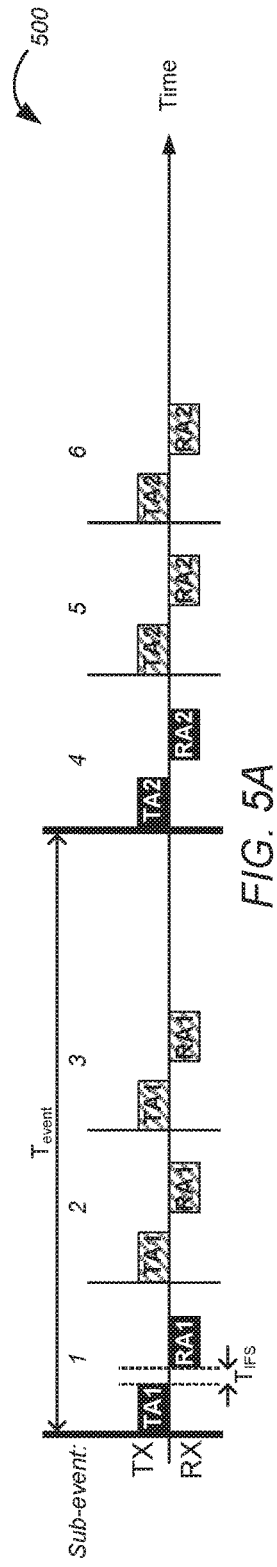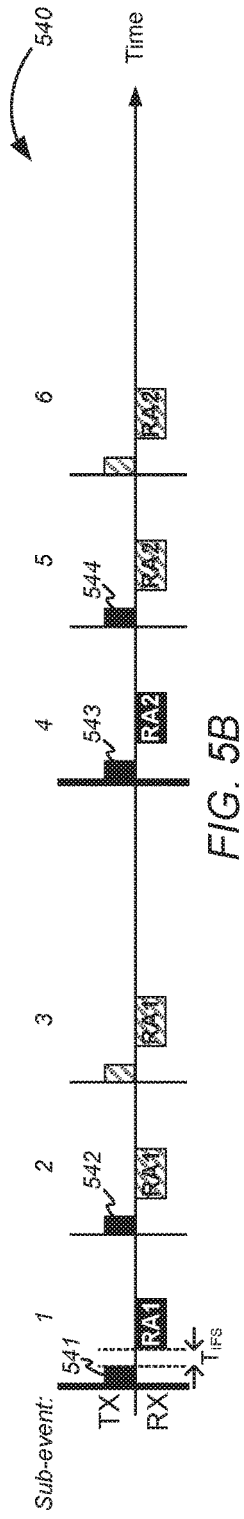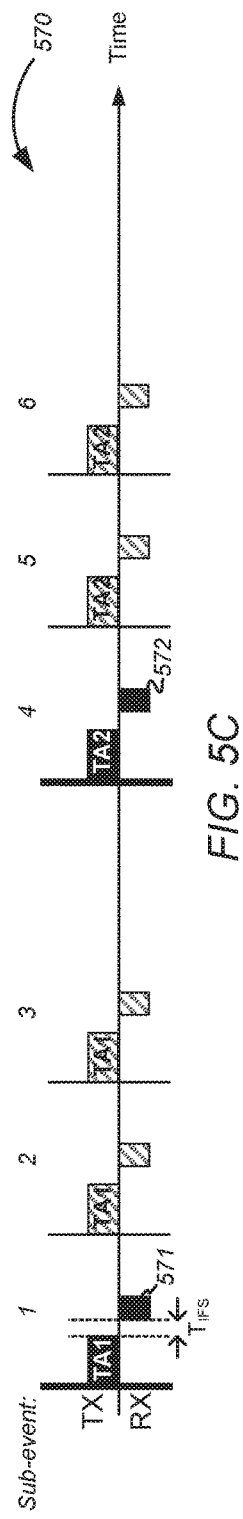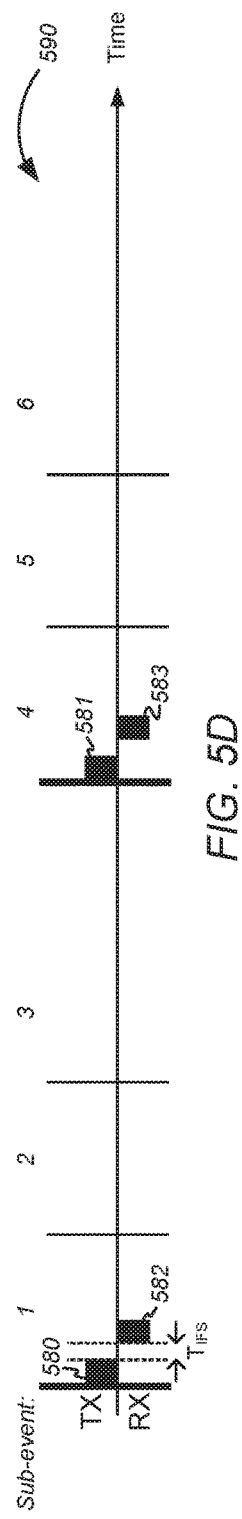
FIG. 5A
FIG. 5B
FIG. 5C
FIG. 5D

DISCONTINUOUS TRANSMISSION ON SHORT-RANGE PACKET-BASED RADIO LINKS

FIELD

The present disclosure relates generally to the field of digital voice communications. More particularly, the present disclosure relates to voice packet transmission over short-range, packet-based synchronous and isochronous wireless communications links.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Enterprises have long considered it essential to equip their workers with communications headsets. A headset increases productivity by freeing up a user's hands to do such things as take notes and operate a computer's peripherals (e.g., keyboard, mouse, etc.), as well as operate a phone's dial pad and the controls of other devices (e.g., smartphone, tablet computer, etc.). Additionally, as enterprises migrate to open office environments, some users find that wearing a headset helps to reduce environmental distractions, thereby allowing for increased focus and productivity. Further, relative to a handset that must be held to a user's ear, a headset reduces head, neck, back, and arm discomfort, as well as potential repetitive strain injuries therefrom.

While headsets have traditionally been corded, which physically tethers a user to his or her phone or computer, wireless headsets offer many obvious benefits (e.g., roaming from a desk without risk of missing a call, reaching for a pencil without a cable knocking over a coffee cup, etc.). Moreover, recent improvements in wireless audio hardware and software, as well as battery technology, allow a user to achieve low-latency wideband audio over a wireless link without worrying about recharging the headset battery until the end of the day. As a result, many users have developed a strong preference for wireless headsets. Wireless communications headsets can be partitioned primarily into two different radio frequency (RF) technologies: DECT and Bluetooth. As used herein, "DECT" devices are devices operating in the Digital European Cordless Telecommunications or Unlicensed Personal Communications Services (UPCS) bands, including Digital Enhanced Cordless Telecommunications telephony devices. Further, as used herein, "Bluetooth" devices are devices operating in accordance with the Bluetooth Core Specifications published by The Bluetooth Special Interest Group (SIG).

Some countries prohibit the operation of DECT devices within their borders. In these countries, Bluetooth headsets have become the preferred type of wireless headset for enterprise users. Further, even in regions where DECT devices are permitted to operate, trends in more permissive corporate bring your own device (BYOD) policies have resulted in a user preference for Bluetooth headsets, which are more easily connected to devices such as smartphones and tablet computers relative to their DECT counterparts. The Bluetooth standard was designed to provide low-cost devices with user-friendly connection establishment processes. Bluetooth operates in the 2.4 GHz ISM RF band, which is relatively crowded within indoor environments, and, at the time of conception, it was not contemplated that Bluetooth headsets would one day become the preferred headset solution for enterprise users. Thus, maximizing user density was not a concern. As the number of Bluetooth devices increases within a given environment, so does the traffic load in the 2.4 GHz spectrum. High traffic loads can result in increased mutual interference between devices, which manifests as unsatisfactory link audio quality. In other words, in some environments, Bluetooth is unable to achieve the desired user density.

SUMMARY

In general, in one aspect, an embodiment features a method for discontinuous transmission on short-range packet-based radio links. The method includes, during a communication session with a far-end system on a short-range packet-based radio link, monitoring for voice-based signals in an audio stream received on an audio line in. The method also includes generating, based on monitoring the audio stream for the voice-based signals, a voice activity estimation signal. Further, the method includes generating, while the voice activity estimation signal exceeds a predetermined threshold, one or more voice packets based on the audio stream, and transmitting the one or more voice packets to the far-end system at one or more times. Still yet, the method includes, in response to determining that the voice activity estimation signal is below the predetermined threshold, transmitting one or more zero-payload packets to the far-end system at one or more subsequent times.

In general, in one aspect, an embodiment features a method for discontinuous transmission on short-range packet-based radio links. The method includes, during a communication session with a far-end system on a short-range packet-based radio link, receiving voice packets from the far-end system. Also, the method includes receiving, subsequent to receiving the voice packets, a first zero-payload packet from the far-end system at a first time. Responsive to receiving the first zero-payload packet, and at a second time, a first voice packet including encoded voice data is transmitted to the far-end system. Additionally, the method includes receiving, from the far-end system at a third time, a second zero-payload packet to acknowledge receipt of the first voice packet.

In general, in one aspect, an embodiment features a method for discontinuous transmission on short-range packet-based radio links. The method includes receiving, during a communication session with a far-end system on a short-range packet-based radio link, an audio stream on an audio line in. The method also includes generating a first voice packet based on the audio stream, and transmitting the first voice packet to the far-end system at a first time. Further, the method includes receiving from the far-end system, at a second time following the first time, a first zero-payload packet to confirm receipt of the first voice packet. Still yet, the method includes generating a second voice packet based on the audio stream, and transmitting the second voice packet to the far-end system at a third time. Moreover, the method includes receiving a second zero-payload packet to confirm receipt of the second voice packet. The second zero-payload packet is received from the far-end system at a fourth time following the third time.

In general, in one aspect, an embodiment features a method for discontinuous transmission on short-range packet-based radio links. The method includes, during a communication session with a far-end system on a short-range packet-based radio link, monitoring for voice-based signals in an audio stream received on an audio line in. The method also includes generating, based on monitoring the audio stream for the voice-based signals, a voice activity estimation signal, and comparing the voice activity estimation signal to a predetermined threshold. Further, the method includes receiving a first voice packet from the far-end system at a first time. Additionally, the method includes, in response to receiving the first voice packet and the voice activity estimation signal falling below the predetermined threshold, transmitting a first zero-payload packet to the far-end system. The first zero-payload packet is transmitted at a second time. The method further includes receiving a second voice packet from the far-end system. The second voice packet is received at a third time. Still yet, the method includes, in response to receiving the second voice packet and the voice activity estimation signal remaining below the predetermined threshold, transmitting a second zero-payload packet to the far-end system. The second zero-payload packet is transmitted at a fourth time.

In general, in one aspect, an embodiment features a method for discontinuous transmission on short-range packet-based radio links. The method includes, during a communication session with a far-end system on a short-range packet-based radio link, monitoring for voice-based signals in an audio stream received on an audio line in. The method also includes generating, based on monitoring the audio stream for the voice-based signals, a voice activity estimation signal and comparing the voice activity estimation signal to a predetermined threshold. Further, the method includes receiving one or more first zero-payload packets from the far-end system at one or more first times. Additionally, the method includes, in response to receiving the first zero-payload packets and the voice activity estimation signal falling below the predetermined threshold, transmitting, at one or more second times, one or more second zero-payload packets to the far-end system. Each of the second times follows one of the first times, such that each of the second zero-payload packets is transmitted following the receipt of a corresponding one of the first zero-payload packets.

The details of one or more implementations are set forth in the accompanying drawings and the description below. Other features will be apparent from the description and drawings, and from the claims.

DESCRIPTION OF DRAWINGS

FIGS. 4A-4D are timing diagrams illustrating operation of a master device and a slave device in discontinuous transmission mode on a short-range packet-based radio link, in accordance with one or more embodiments of the invention.

FIGS. 5A-5D are timing diagrams illustrating operation of a master device and a slave device in discontinuous transmission mode on a short-range packet-based radio link, in accordance with one or more embodiments of the invention.

DETAILED DESCRIPTION

Figure 1A:
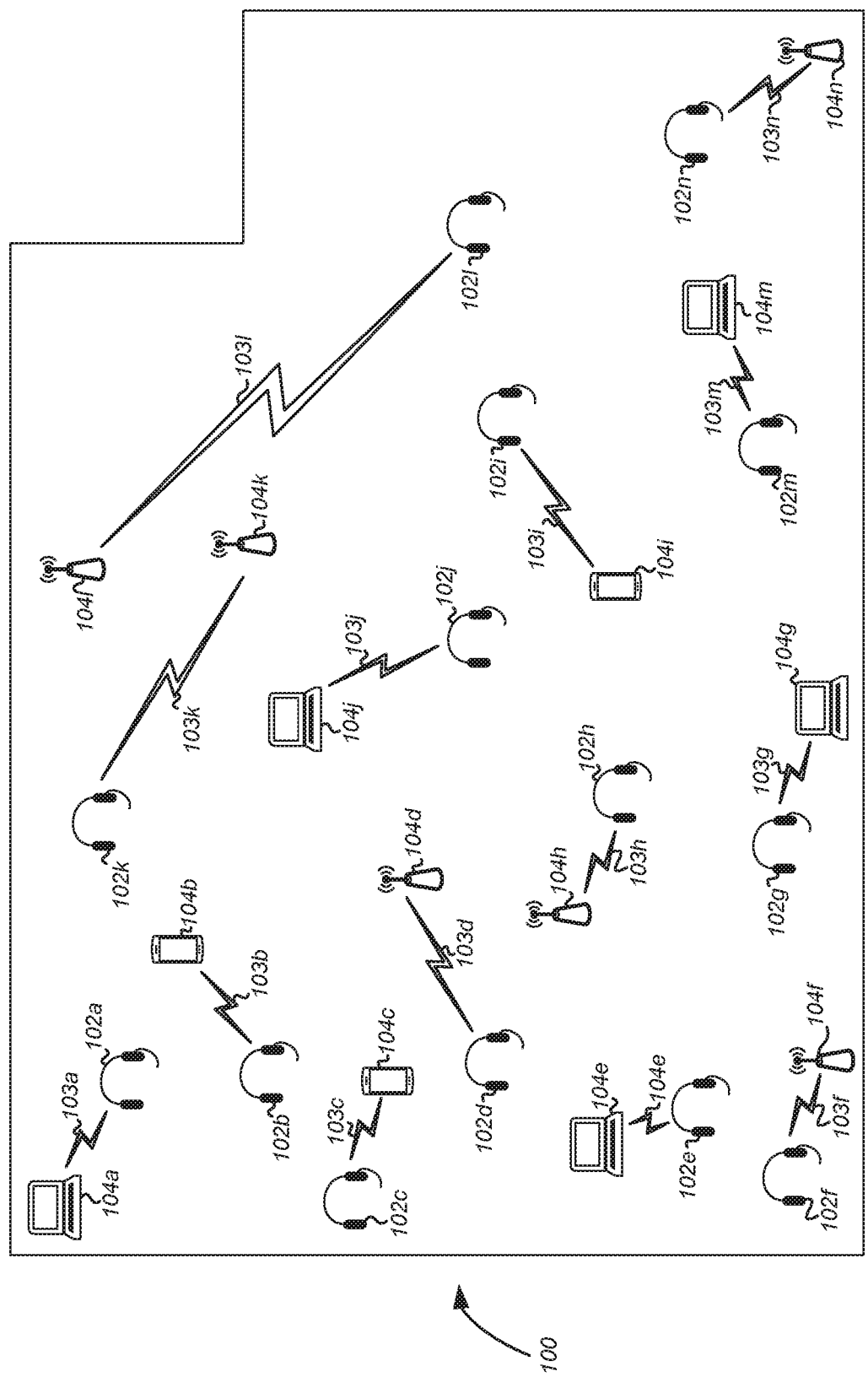
FIG. 1A shows an environment in which discontinuous transmission may be implemented on a short-range packet-based radio link, in accordance with one or more embodiments of the invention.

Specific embodiments of the invention are here described in detail, below. In the following description of embodiments of the invention, the specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In the following description, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between like-named elements. For example, a first element is distinct from a second element, and the first element may encompass more than one element and succeed (or precede) the second element in an ordering of elements.

As user-demand increases for wireless headsets in enterprise environments, Bluetooth headsets have come to satisfy a substantial part of the demand. This is due to numerous factors. First, Bluetooth headsets are easily connectable to user-owned devices, such as smartphones. Second, a Bluetooth headset can simultaneously connect to two devices, such as a smartphone and a computer, allowing a user to listen to their personal music while remaining available to answer incoming calls to either device. Unfortunately, however, Bluetooth was originally developed to provide short-range, ad-hoc connections for wireless peripherals to mobile devices, and development of the Bluetooth Core Specifications has largely proceeded without concern as to managing user density issues. In other words, although Bluetooth has been embraced by workers in enterprise environments, it was not optimized for widespread adoption in such environments, as its focus, since inception, has largely been on low-power and low-cost hardware. This focus has continued with more recently developed versions of the Bluetooth Core Specification. For example, Bluetooth Low Energy, as first set forth in version 4.0 of the Core Specification, was designed with the intent to reduce power and cost even further.

In the enterprise, user density (i.e., the number of simultaneous voice links of acceptable audio quality per unit-squared area) remains a key concern. While Bluetooth Classic may be comparable with DECT in some user density metrics, looking forward to Bluetooth Low Energy the number of users that may operate wireless links at acceptable error rates could drop by as much as 50% relative to Bluetooth Classic due to relaxed radio parameters.

For the above reasons, limits on the user density of Bluetooth devices in enterprise environments is a problem that is expected to continue growing.

In cellular systems, discontinuous transmission (DTX) is one methodology available to reduce RF emissions from portable user devices, thereby reducing the RF noise floor and allowing for increased user density in a given area. However, discontinuous transmission as implemented in cellular systems is not applicable to short-range packet-based technologies such as Bluetooth. For example, on Bluetooth voice links specifically, it is problematic for a device to stop sending packets in one direction, as packet headers from that device may include acknowledgement information expected by the far end of the link.

In general, embodiments of the invention provide systems, methods, and computer readable media for implementing discontinuous transmission on a short-range packet-based voice link such as Bluetooth. The systems and methods described herein provide a transmitter with functionality to identify pauses in voice communications over an active voice link, and, during such pauses, transition to a discontinuous transmission mode characterized by low duty cycle packet transmissions that reduce RF spectrum utilization and noise for nearby devices. As an option, the transmitter may, while in the discontinuous transmission mode, infrequently send one or more packets that include comfort noise information. Comfort noise is needed in the recipient device to give the user the perception that the communication line is not broken and that the other user is still present although not talking.

By way of the systems and methods described herein, the duty cycle of a short-range packet-based voice link, such as a Bluetooth link, may be reduced. Such a reduction in duty cycle can have a significant impact on user density. For example, if the systems and methods described herein are employed in both directions of a short-range packet-based voice link, and it is assumed that the traffic load in each direction is decreased by 30%, then an overall increase in user density of almost 60% may be achieved. Consequently, the various implementations of discontinuous transmission on short-range packet-based voice links described hereinbelow allow a significantly greater number of users to concurrently operate Bluetooth headsets in a given area of fixed size, such as an office environment. Additionally, because of the reduced duty cycle (i.e., radio-on time) at a given transceiver, reduced power consumption may allow for devices with smaller batteries and/or increased device operating times before requiring recharge.

FIG. 1A shows an environment 100 for implementing discontinuous transmission on a short-range packet-based radio link, according to one or more embodiments. Although the elements of the environment 100 are presented in one arrangement, other embodiments may feature other arrangements, and other configurations may be used without departing from the scope of the invention. For example, various elements may be combined to create a single element. As another example, the functionality performed by a single element may be performed by two or more elements. In one or more embodiments of the invention, one or more of the elements shown in FIG. 1A may be omitted, repeated, and/or substituted. Accordingly, various embodiments may lack one or more of the features shown. For this reason, embodiments of the invention should not be considered limited to the specific arrangements of elements shown in FIG. 1A.

As depicted in FIG. 1A, an environment 100 includes several wireless headsets 102 (i.e., wireless headsets 102a-102n). Each of the wireless headsets 102 currently maintains an active short-range packet-based radio link 103 (i.e., wireless links 103a-103n, respectively) with a corresponding host device 104 (i.e., host devices 104a-104n, respectively). In other words, each of the wireless links 103 connects a wireless headset 102 and a corresponding host device 104. For example, a first wireless link 103a is active between a first wireless headset 102a and a first host device 104a; a second wireless link 103b is active between a second wireless headset 102b and a second host device 104b; a third wireless link 103c is active between a third wireless headset 102c and a third host device 104c, and so on.

As used herein, a wireless headset 102 is a head-worn or body-worn device configured to form a short-range packet-based radio link 103 with another device (e.g., a dongle, a mobile phone, a tablet computer, a laptop computer, a desktop computer, a base station, etc.). Each wireless headset 102 includes a speaker and a microphone configured such that, when the wireless headset 102 is worn by a user, the speaker is positioned proximate to an ear of the wearing user and the microphone is positioned for monitoring the speech of the user. Accordingly, a wireless headset 102 may include a monaural headset or stereo headset, whether worn by a user over-the-ear (e.g., circumaural headphones, etc.), in-ear (e.g., earbuds, earphones, neck-worn devices, etc.), or on-ear (e.g., supraaural headphones, etc.). Each of the wireless headsets 102 may be utilized by a user to participate in telephone calls made from and received at the corresponding host device 104. For purposes of simplicity and clarity, the present disclosure describes the invention in the context of wireless headsets, however it is understood that the systems and methods for discontinuous transmission disclosed herein are also applicable to other devices with a microphone for picking up near-end call audio and a speaker for rendering call audio received over a network from a far end, such as wireless handsets and speakerphones.

As described herein, each of the short-range packet-based radio links 103 (i.e., wireless links 103) includes an air interface deploying one or more carrier frequencies on which a host device 104 and a wireless headset 102 exchange packetized communications, including voice and non-voice data. In one or more embodiments, a wireless link 103 may have a range of less than approximately 100 meters. In one or more embodiments, each of the wireless links 103 may be formed and operate (i.e., exchange data) in accordance with one or more of the Bluetooth Core Specifications published by The Bluetooth SIG, the details of which are beyond the scope of the present document. Thus, in one or more embodiments, each of the wireless headsets 102 may include a Bluetooth headset of any form factor, and each of the wireless links 103 may include a frequency-hopping spread spectrum (FHSS) connection. FHSS serves to reduce the incidence of mutual interference (e.g., packet collisions) with other wireless links 103, as well as mitigate the impact of a fixed frequency broadcast from another device (not shown) on the wireless links 103. In combination with error correction schemes (e.g., automatic retransmission or ARQ), FHSS provides robustness in an environment prone to (Rayleigh) fading caused by multipath.

As described herein, each of the host devices 104 includes any device operable as a call endpoint, or which can be coupled to a call endpoint, that delivers call audio, which has been received over a network, to a headset 102. Also, each of the host devices 104 receives transmitted call audio from the headset 102 over a wireless link 103, for delivery over the network. The host devices 104 may include mobile phones (e.g., smartphones, etc.), desk phones, dongles, tablet devices, laptop computers, desktop computers, and/or base stations. The network may include any private or public communications network, wired or wireless, such as, for example, a local area network (LAN), wide area network (WAN), the Internet, cellular voice network, cellular data network, and/or public switched telephone network (PSTN).

The environment 100 may include any physical space occupied by one or more persons at a given time. The environment 100 may include one or more of offices, an open workspace, a factory floor, etc. For example, the environment 100 may include a call center or an assembly line. For each active short-range packet-based radio link 103 between a headset 102 and a host device 104, a user may be presently engaged in a phone call with a third-party (e.g., a customer, a client, a co-worker, a manager, etc.), exchanging non-call audio (e.g., streaming audio, playing music, etc.), and/or exchanging other data (e.g., status updates, configuration settings, etc.).

Depending on the physical characteristics of the environment 100, other electronic devices operating in the environment 100, and the operating parameters (e.g., power, link type, etc.) of the wireless headsets 102, the environment 100 may support a density of tens or hundreds of simultaneous active wireless links 103. Despite the benefits of increased density realized by FHSS and other technologies, mutual interference between the wireless links 103 will intensify as the number of wireless links 103 within the environment 100 increases.

Figure 1B:
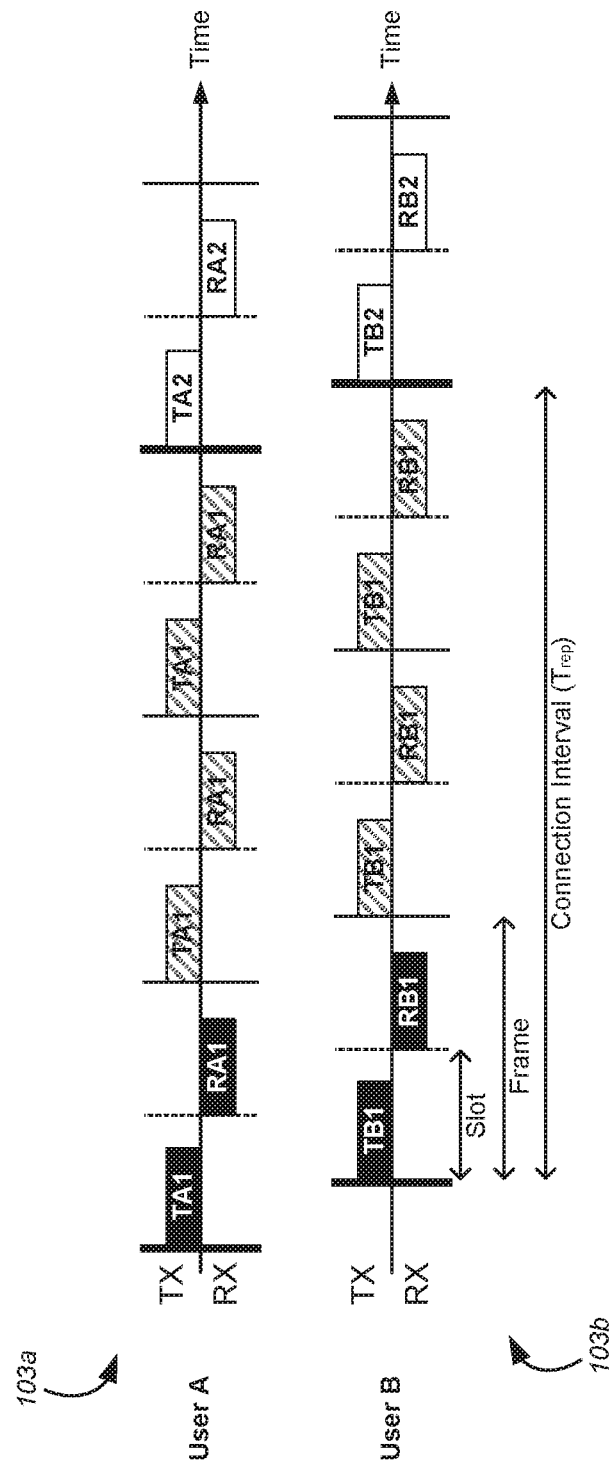
FIG. 1B shows a timing diagram illustrating mutual interference between radio links.

For example, FIG. 1B is a timing diagram illustrating mutual interference between a first short-range packet-based radio link 103a of User A and a second short-range packet-based radio link 103b of User B. As illustrated in FIG. 1B, the first wireless link 103a is a time-slotted connection between a first device (TX) (i.e., a master, a first wireless headset 102a) and a second device (RX) (i.e., a slave, a first host device 104a). Similarly, the second wireless link 103b is a time-slotted connection between a third device (TX) (i.e., a master, a second wireless headset 102b) and a fourth device (RX) (i.e., a slave, a second host device 104b).

On both the first wireless link 103a and the second wireless link 103b, packets are sent at a predetermined connection interval ($T_{rep}$). The connection interval may be further broken down into frames and/or slots. In the example shown in FIG. 1B, each connection interval is divided into three frames, and each frame includes two slots. Further, as shown in FIG. 1B, the first frame in a connection interval provides an opportunity for both the master and slave to transmit a packet. In particular, within the first frame of each connection interval of the wireless links 103 of FIG. 1B, a first slot is reserved for the master to send a first packet (i.e., packets TA1, TB1, TA2, TB2) to the corresponding slave, and a second slot is reserved for the slave to send a second packet (i.e., packets RA1, RB1, RA2, RB2) to the master. Subsequent frames in the same connection interval may be reserved for retransmission attempts, which are shown as hashed boxes in respective timeslots, as needed. Although the connection intervals of FIG. 1B are shown to include two frames for retransmission attempts, it is understood that a connection interval may provide more or less than two retransmission frames. For example, a connection interval may include for 0, 1, 4, etc. retransmission frames.

Mutual interference occurs when two or more packets overlap both in frequency (i.e., carrier) and in time, and are received at comparable power levels, resulting in a low signal-to-interference ratio (SIR). Referring to FIG. 1B specifically, the packet TB1 of User B partially overlaps in the time domain both the packet TA1 from User A's headset and the packet RA1 from User A's host device. Accordingly, as illustrated in FIG. 1B, mutual interference occurs between the first wireless link 103a and the second wireless link 103b when the packet TB1 of User B overlaps in the frequency domain the packet TA1 and/or the packet RA1. Similarly, packet RB1 of User B may interfere with the packet RA1 if it overlaps packet RA1 in the frequency domain, and/or interfere with the retransmitted packet TA1 if it overlaps retransmitted packet TA1 in the frequency domain. Still further, retransmitted packet TB1 may interfere with retransmitted packet TA1 and/or retransmitted packet RA1, and so on.

Referring back to FIG. 1A, as the number of short-range packet-based radio links 103 operating on the same carriers in the environment 100 increases, so does the likelihood of packet collisions, and therefore frame erasures. As a result, call quality can quickly decline, frustrating users in the environment 100. Described hereinbelow are systems and methods for implementing discontinuous transmission at the wireless headsets 102 and host devices 104. The systems and methods for discontinuous transmission disclosed hereinbelow increase the number of wireless links 103 that may operate concurrently in the environment 100 while remaining below a threshold number of frame erasures, and saving battery power.

Figure 2A:
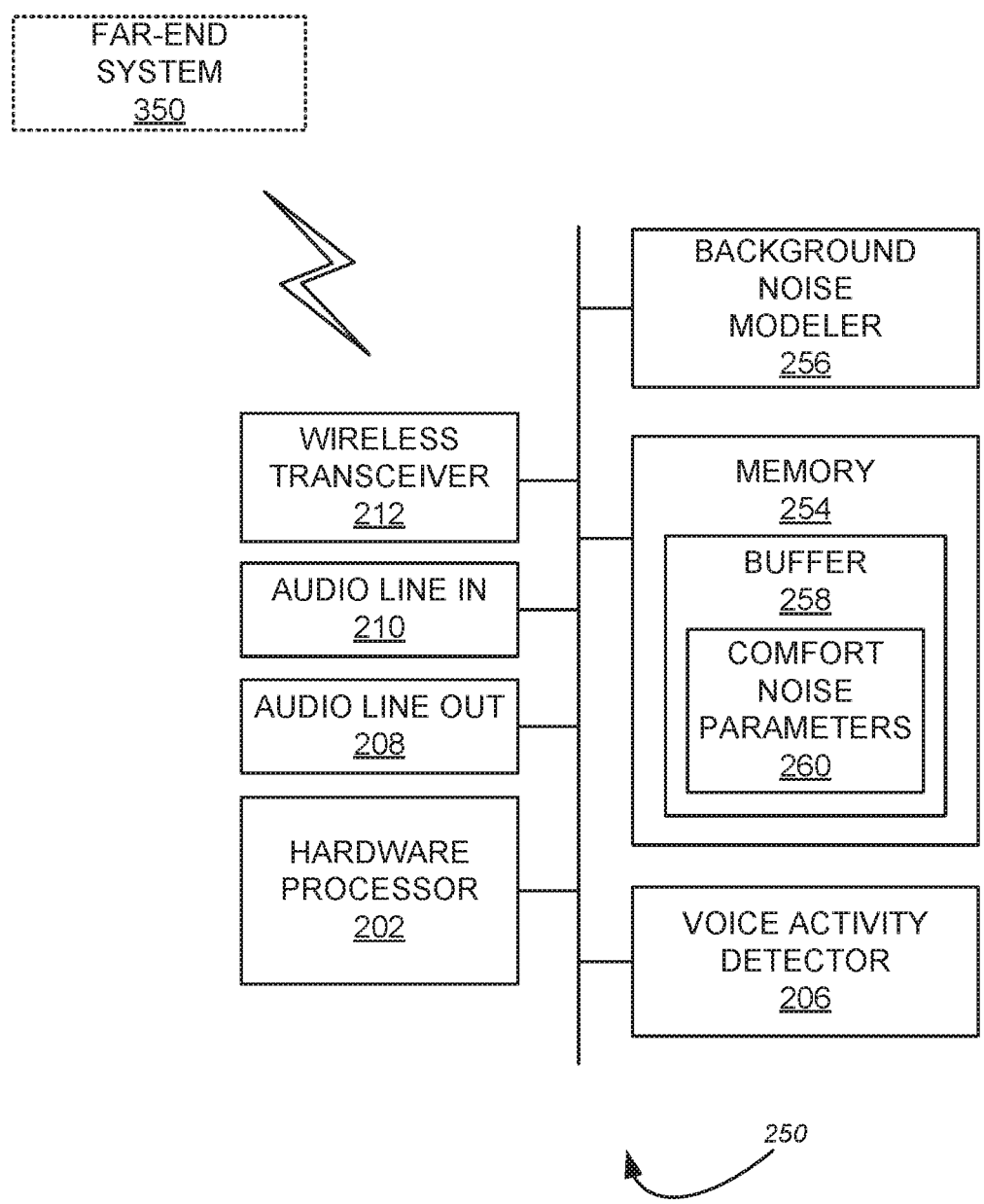
FIG. 2A is a simplified block diagram depicting a system for initiating discontinuous transmission on a short-range packet-based radio link, in accordance with one or more embodiments of the invention.

FIG. 2A depicts a simplified block diagram of a system 250 for initiating discontinuous transmission on a short-range packet-based radio link and providing comfort noise information, according to one or more embodiments. Although the elements of the system 250 are presented in one arrangement, other embodiments may feature other arrangements, and other configurations may be used without departing from the scope of the invention. For example, various elements may be combined to create a single element. As another example, the functionality performed by a single element may be performed by two or more elements. In one or more embodiments of the invention, one or more of the elements shown in FIG. 2A may be omitted, repeated, and/or substituted. Accordingly, various embodiments may lack one or more of the features shown. For this reason, embodiments of the invention should not be considered limited to the specific arrangements of elements shown in FIG. 2A.

As shown in FIG. 2A, the system 250 includes a hardware processor 202 operably coupled to a memory 254, a background noise modeler 256, a voice activity detector (VAD) 206, an audio line out 208, an audio line in 210, and a wireless transceiver 212. In one or more embodiments, the hardware processor 202, the memory 254, the VAD 206, the background noise modeler 256, the wireless transceiver 212, the audio line in 210, and the audio line out 208 may remain in communication over one or more communication busses. Although not depicted in FIG. 2A for purposes of simplicity and clarity, it is understood that, in one or more embodiments, the system 250 may include one or more of a display, a haptic device, a user-operable control (e.g., a button, slide switch, capacitive sensor, touch screen, etc.), and an audio codec for encoding and decoding call audio sent and received via the wireless transceiver 212.

As described herein, the audio line in 210 includes any channel configured for receiving a first stream of call audio, whether digital and/or analog. Further, the audio line out 208 includes any channel configured for outputting a second stream of call audio, whether digital and/or analog. The wireless transceiver 212 modulates one or more carrier channel frequencies to transmit information to, and demodulates one or more carrier channel frequencies to receive information from, a far-end system 350 over an air interface. In one or more embodiments, the wireless transceiver 212 may be, for example, a Bluetooth transceiver. By way of the wireless transceiver 212, the system 250 forms a short-range packet-based radio link with a far-end system 350. In one or more embodiments, the far-end system 350 comprises a remote device operable to detect when the system 250 has transitioned into and out of discontinuous transmission mode. As described below, when the system 250 is in discontinuous transmission mode, the far-end system 350 will receive zero-payload packets periodically interspersed with comfort noise packets, both transmitted by the wireless transceiver 212. The far-end system 350 is described below in the context of FIG. 2B.

As described herein, the hardware processor 202 processes data, including the execution of applications stored in the memory 254. In one or more embodiments, the hardware processor 202 is a high performance, highly integrated, and highly flexible system-on-chip (SOC), including signal processing functionality such as statistical signal processing, echo cancellation/reduction, and/or gain control. In one or more embodiments, the hardware processor 202 may include a variety of processors (e.g., digital signal processors, etc.), analog-to-digital converters, digital-to-analog converters, etc., with conventional CPUs being applicable.

The VAD 206 is operable to perform speech processing on, and to detect any voice-based signals (i.e., human speech) within, an audio stream received on the audio line in 210. Accordingly, the VAD 206 continually estimates the likelihood of the presence of human speech in the audio stream received on the audio line in 210, and outputs a voice activity estimation signal, which may be received by the hardware processor 202. The voice activity estimation signal may be a continuous signal or a discrete signal. Responsive to the voice activity estimation signal from the VAD 206 falling below (or exceeding, depending on configuration) a predetermined threshold, the wireless transceiver 212 outputs zero-payload packets in lieu of voice packets.

The memory 254 includes any storage device capable of storing information temporarily or permanently. The memory 254 may include volatile and/or non-volatile memory, and may include more than one type of memory. For example, the memory 254 may include one or more of SDRAM, ROM, and flash memory. In one or more embodiments, the memory 254 may include a link key, a random number generator, and a device address (e.g., BD_ADDR, etc.). The memory 254 of the system 250 is shown to include a buffer 258, and the buffer 258 is shown to include comfort noise parameters 260. Each of these is described in turn below.

The background noise modeler 256 includes a routine that, when executed by a hardware processor, characterizes the incoming audio stream on the audio line in 210. In particular, the background noise modeler 256 stores to the buffer 258, as the comfort noise parameters 260, a sequence of records that characterize the background noise on the audio line in 210 over time. Each record of the comfort noise parameters 260 may include a background noise energy level and/or a background noise frequency distribution.

In one or more embodiments, the background noise modeler 256 characterizes the incoming audio stream responsive to the voice activity estimation signal from the VAD 206 crossing a threshold. As one option, when speech is no longer present on the audio line in 210, the background noise modeler 256 may use what audio remains on the audio line in 210 to generate the comfort noise parameters 260. As another option, the background noise modeler 256 may be active while speech is present on the audio line in 210. For example, comfort noise parameters 260 may be distilled from the audio on the audio line in 210, and stored to the buffer 258, while the speech is ongoing. In other words, while a voice activity estimation signal exceeds the predetermined threshold, the comfort noise parameters 260 are extracted from the audio stream on the audio line in 210. In such an example, the comfort noise parameters 260 may be transmitted while the system 250 is or is not discontinuous transmission mode. If the comfort noise parameters 260 are sent while the system 250 is not in discontinuous transmission mode, then the system 250 will not need to send comfort noise parameters 260 to the far-end system 350 when the system 250 subsequently enters discontinuous transmission mode.

The buffer 258 may include a circular buffer that stores a moving window of records for a predetermined duration of seconds or minutes. For example, the buffer 258 may include records of the comfort noise parameters 260 for a moving window of 1 second, 5 seconds, 10 seconds, 30 seconds, 5 minutes, 10 minutes, etc.

While in discontinuous transmission mode in which the system 250 transmits zero-payload packets in lieu of voice packets to the far-end system 350, the hardware processor 202 may periodically generate a comfort noise packet using the comfort noise parameters 260. For example, the hardware processor 202 may generate a comfort noise packet every 1 second, 5 seconds, 10 seconds, 15 seconds, etc. Such comfort noise packets may be transmitted by the wireless transceiver 212 to the far-end system 350. As described herein, a comfort noise packet includes any data packet having a payload describing comfort noise. In one or more embodiments, a comfort noise packet may include a Silence Insertion Descriptor (SID) frame. A comfort noise packet may be generated using all or a subset of the records of the comfort noise parameters 260. For example, two or more records of the comfort noise parameters 260 may be averaged to generate a comfort noise packet.

As described herein, a voice packet includes any packet including a payload of bit-encoded call audio data. A voice packet in the context of a Bluetooth link may comprise, for example, a high-quality voice packet such as an HV1 packet, HV2 packet, HV3 packet, EV3 packet, EV4 packet, EV5 packet, etc. Further, a zero-payload packet includes any packet without a payload. In one or more embodiments, a zero-payload packet may include an access code, such as a channel access code, and/or a header. For example, in the context of a Bluetooth link, the zero-payload packets sent by the wireless transceiver 212 may include a medium-rate (i.e., DM-type) data packet (e.g., DM1, DM3, DM5, etc.) and/or a high-rate (i.e., DH-type) data packet (e.g., DH1, DH3, DH5, etc.), as defined by the Bluetooth Core Specification, with a PDU header indicating a payload of length 0 and no payload. Of course, however, a zero-payload packet may be any type of packet without a payload, regardless of whether a header of the packet does or does not include a length indication signaling that the payload is empty. As another example in the context of a Bluetooth link, the zero-payload packets sent by the wireless transceiver 212 may include a NULL and/or a POLL packet as defined by the Bluetooth Core Specification. NULL and POLL packets lack a PDU header and a cyclic redundancy check (CRC) code, which is included in DM-type and DH-type packets. Accordingly, use of NULL and/or POLL packets minimizes radio-on time relative to DM-type and DH-type zero-payload packets. Irrespective of the format of the packet and the definition of payload, it will be understood that during discontinuous transmission packets are sent which are considerably shorter than the ordinary voice packets used during a voice call, thus reducing the duty cycle and allowing higher densities.

Regardless of the type of zero-payload packets used, the output of the VAD 206 activates or deactivates a discontinuous transmission state of the system 250. When discontinuous transmission is activated, resources of the system 250 may be conserved by avoiding the encoding of audio received on the audio line in 210 into packets for transmission by the wireless transceiver 212 and/or by avoiding the activation of the wireless transceiver 212 for a period of time longer than required to transmit a zero-payload packet. Thus, in the system 250, the transmission of voice packets by the wireless transceiver 212 may be replaced by the transmission of zero-payload packets when no speech is detected by the VAD 206 on the audio line in 210. Consequently, a traffic load over the wireless link is reduced by abstaining from sending voice packets when it is determined the relevant user is not talking. Furthermore, power consumption in system 250 is reduced by not encoding the voice signal and not sending a voice payload, thus extending battery life.

The use of zero-payload packets may allow the system 250 and/or the far-end system 350 to enter discontinuous transmission mode without first requiring the exchange of control messages at any other layer of the communications protocol stack. For example, in the case of a Bluetooth link, the system 250 may fluidly move into and out of discontinuous transmission mode without any negotiation between the system 250 and the far-end system 350 at the Link Manager Protocol layer. Negotiation at such protocol layers can add delay to transitions into and out of discontinuous transmission mode, which can result in speech clipping at speech activity transitions.

In the context of a Bluetooth link, a comfort noise packet may be a DM-type or a DH-type packet. For example, while in discontinuous transmission mode the system 250 may transmit a stream of zero-payload packets periodically interspersed (e.g., every 3 seconds, every 5 seconds, every 10 seconds, etc.) with a DM-type or DH-type packet that includes comfort noise information sufficient for the far-end system 350 to render comfort noise that is output by a speaker, or sent over a network. Thus, relative to the rate of transmission of voice packets when discontinuous transmission mode is not enabled at the system 250, the transmission rate of packets containing comfort noise information may be very low.

While some systems have implemented a method of discontinuous transmission whereby the transmitter simply stops sending packets, such a solution is impracticable on certain short-range packet-based wireless links, including Bluetooth links. For example, on some synchronous packet-based radio links, including Bluetooth links, it is not possible for one device to simply stop sending packets, as the other device may assume that the link has been lost, and close the connection. Also, on some synchronous packet-based radio links, including Bluetooth links, received packets must be acknowledged by the receiving device, otherwise the transmitting device will automatically retransmit the previously-sent packet, thereby creating unnecessary RF interference in the environment. Still further, on some synchronous packet-based radio links, including Bluetooth links, a slave is only permitted to send a packet in its timeslot when it has been addressed by a master in the preceding timeslot. Accordingly, a slave on such a link is unable to send its voice packets if no packets are received from the master to trigger the slave transmissions. For these reasons, the systems and methods disclosed herein enable discontinuous transmission on certain short-range packet-based wireless links using zero-payload packets that facilitate the continued normal operation of the far-end transceiver, including triggering the transmission of voice packets and acknowledgement messages by the far-end transceiver.

Figure 2B:
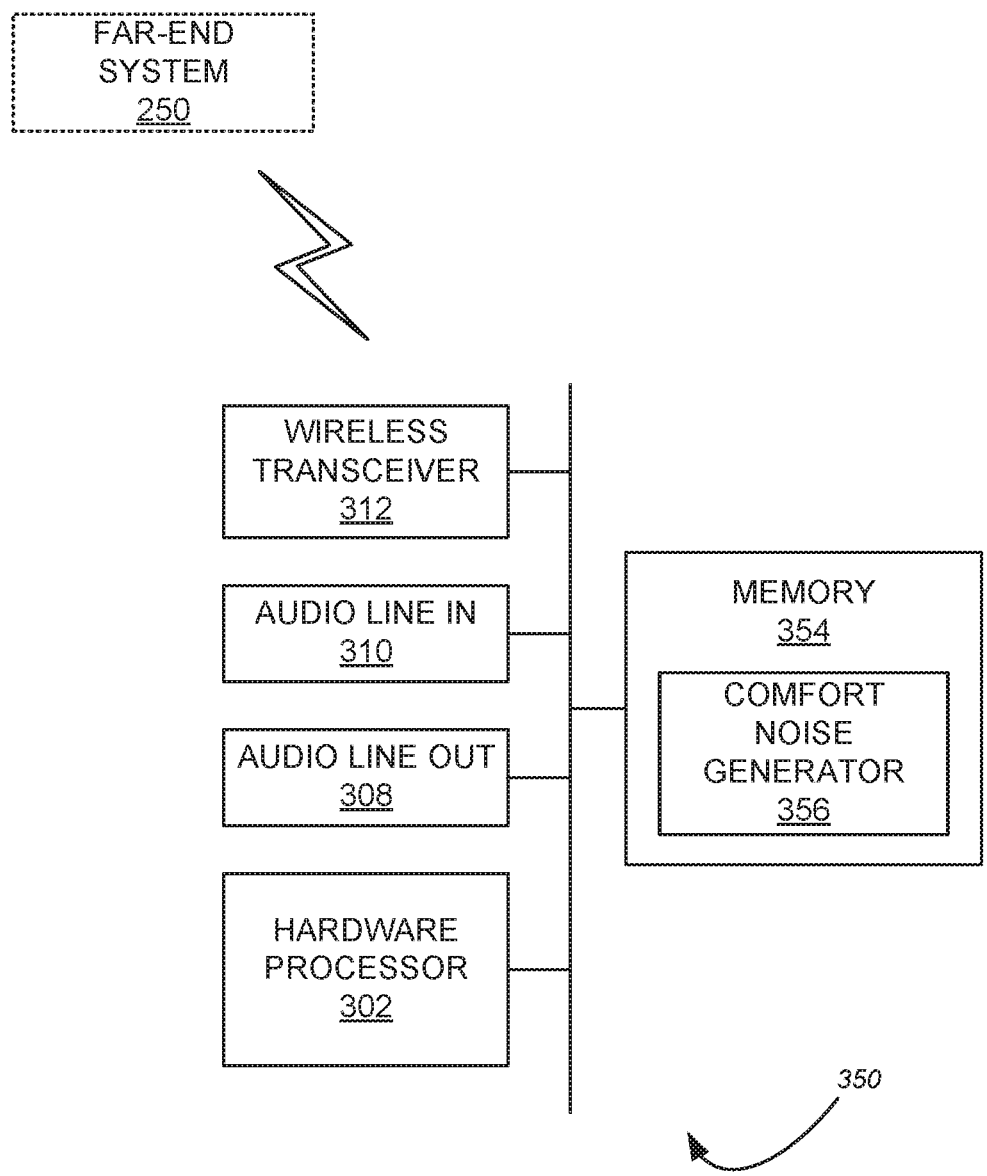
FIG. 2B is a simplified block diagram depicting a system for identifying a transition to discontinuous transmission mode by a far-end system on a short-range packet-based radio link, in accordance with one or more embodiments of the invention.

FIG. 2B depicts a simplified block diagram of a system 350 for identifying a transition to discontinuous transmission mode by a far-end system 250 on a short-range packet-based radio link, according to one or more embodiments. Although the elements of the system 350 are presented in one arrangement, other embodiments may feature other arrangements, and other configurations may be used without departing from the scope of the invention. For example, various elements may be combined to create a single element. As another example, the functionality performed by a single element may be performed by two or more elements. In one or more embodiments of the invention, one or more of the elements shown in FIG. 2B may be omitted, repeated, and/or substituted. Accordingly, various embodiments may lack one or more of the features shown. For this reason, embodiments of the invention should not be considered limited to the specific arrangements of elements shown in FIG. 2B.

As shown in FIG. 2B, the system 350 includes a hardware processor 302 operably coupled to a memory 354, an audio line out 310, an audio line in 310, and a wireless transceiver 312. In one or more embodiments, the hardware processor 302, the memory 354, the wireless transceiver 312, the audio line in 310, and the audio line out 308 may remain in communication over one or more communication busses. Although not depicted in FIG. 2B for purposes of simplicity and clarity, it is understood that, in one or more embodiments, the system 350 may include one or more of a display, a haptic device, a user-operable control (e.g., a button, slide switch, capacitive sensor, touch screen, etc.), and an audio codec for encoding and decoding call audio sent and received via the wireless transceiver 312.

By way of the wireless transceiver 312, the system 350 forms a short-range packet-based radio link with a far-end system 250. The far-end system 250 comprises a remote device operable to transition into and out of discontinuous transmission mode. When the far-end system 250 is in discontinuous transmission mode, the far-end system 250 may transmit zero-payload packets periodically interspersed with comfort noise packets to the system 350. The far-end system 250 is described above in the context of FIG. 2A.

In one or more embodiments, the system 350 comprises a wireless headset, such as a wireless headset 102 described above in the context of FIG. 1A. In such embodiments, the wireless transceiver 312 forms a wireless link with a host device (i.e., the far-end system 250), such as a host device 104 described above in the context of FIG. 1A. Also, in such embodiments, the audio line in 310 receives audio from a microphone configured to pick up speech from a wearing user, and the audio line out 308 outputs audio to one or more speakers configured to render call audio to the user. As described in further detail below, the contents of a call audio stream output on the audio line out 308 may depend on whether the far-end system 250 (i.e., host device) is in discontinuous transmission mode.

In one or more embodiments, the system 350 may comprise a host device, such as a host device 104 described above in the context of FIG. 1A. In such embodiments, the wireless transceiver 312 forms a wireless link with a wireless headset (i.e., the far-end system 350), such as a wireless headset 102 described above in the context of FIG. 1A. In such embodiments, near-end call audio is received from the wireless headset via the wireless transceiver 312, and output over the audio line out 308, for subsequent delivery over a network to a remote party, and the audio line in 310 includes any channel for receiving a call audio stream originating from the remote party. The call audio stream from the remote party may be received over a network, as set forth above. As described in further detail below, a content of a call audio stream output on the audio line out 308 may depend on whether the far-end system 250 (i.e., wireless headset) is in discontinuous transmission mode.

When the far-end system 250 is not in discontinuous transmission mode, and is sending voice packets, the voice packets may be decoded for output as audio on the audio line out 308. However, when the far-end system 250 is in discontinuous transmission mode, and is transmitting zero-payload packets, the audio stream on the audio line out 308 may be generated using the comfort noise generator 356, described below.

As described herein, the audio line in 310 includes any channel configured for receiving a first stream of call audio, whether digital and/or analog. Further, the audio line out 308 includes any channel configured for outputting a second stream of call audio, whether digital and/or analog. The wireless transceiver 312 modulates one or more carrier channel frequencies to transmit information to, and demodulates one or more carrier channel frequencies to receive information from, a far-end system 250 over an air interface. In one or more embodiments, the wireless transceiver 312 may be, for example, a Bluetooth transceiver. Accordingly, by way of the wireless transceiver 312, the system 350 forms a short-range packet-based radio link (i.e., wireless link) with the far-end system 250.

As described herein, the hardware processor 302 processes data, including the execution of applications stored in the memory 354. In one or more embodiments, the hardware processor 302 is a high performance, highly integrated, and highly flexible system-on-chip (SOC), including signal processing functionality such as statistical signal processing, echo cancellation/reduction, and/or gain control. In one or more embodiments, the hardware processor 302 may include a variety of processors (e.g., digital signal processors, etc.), analog-to-digital converters, digital-to-analog converters, etc., with conventional CPUs being applicable.

The memory 354 includes any storage device capable of storing information temporarily or permanently. The memory 354 may include volatile and/or non-volatile memory, and may include more than one type of memory. For example, the memory 354 may include one or more of SDRAM, ROM, and flash memory. In one or more embodiments, the memory 354 may include one or more of a link key, a random number generator, and a device address (e.g., BD_ADDR, etc.).

The memory 354 of the system 350 is shown to include a comfort noise generator 356. The comfort noise generator 356 includes a routine that, when executed by the hardware processor 302, generates comfort noise output on the audio line out 308. In one or more embodiments, the comfort noise generator 356 generates the comfort noise based on one or more comfort noise packets received from the far-end system 250. These comfort-noise packets could have been received interspersed between the voice packet stream when the far-end system 250 is not in discontinuous transmission mode, or these comfort-noise packets could have been received interspersed between the zero-load packet stream when the far-end system 250 is in discontinuous transmission mode. The comfort noise generator 356 may be invoked in response to receipt of a zero-payload packet. The comfort noise generator 356 may generate comfort noise until a voice packet is again received at the wireless transceiver 312 from the far-end system 250. In other words, using the comfort noise generator 356, the system 350 is operable to generate comfort noise audio while zero-payload packets are received from the far-end system 250. In one or more embodiments, the comfort noise generator 356 may average or otherwise combine the comfort noise parameters of two or more comfort noise packets received without any voice packets therebetween.

Thus, a small payload of comfort noise information may be sent at a low rate (e.g., every 1 second, 3 seconds, 10 seconds, etc.) from the far-end system 250 to the system 350, to ensure that a user experiences some background sound, assuring the user that a connection is still present. Alternatively, no comfort noise information is sent during discontinuous transmission at all, but system 350 bases its comfort noise generation on comfort noise information received in the past when the connection was not in discontinuous transmission. Because of the reduced rate of payload-containing transmissions from the far-end system 250, the traffic on the wireless link between the far-end system 250 and the system 350 will be reduced considerably relative to a wireless link in which the far-end system 250 continuously transmits voice packets, as described below in reference to FIG. 4A. As noted above, a reduced traffic load reduces mutual interference between devices in an environment, directly allowing for increased user density.

Figure 3A:
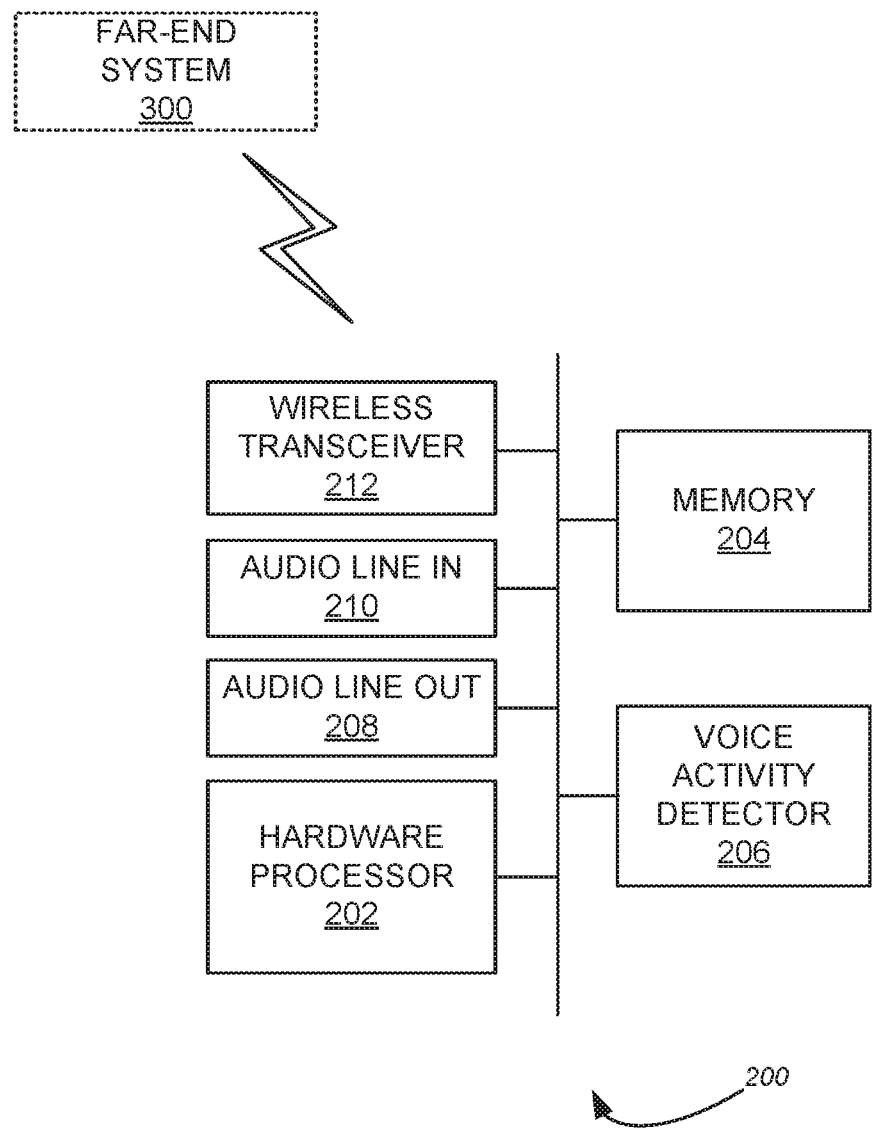
FIG. 3A is a simplified block diagram depicting a system for initiating discontinuous transmission on short-range packet-based radio links, in accordance with one or more embodiments of the invention.

FIG. 3A depicts a simplified block diagram of a system 200 for initiating discontinuous transmission on a short-range packet-based radio link, according to one or more embodiments. Although the elements of the system 200 are presented in one arrangement, other embodiments may feature other arrangements, and other configurations may be used without departing from the scope of the invention. For example, various elements may be combined to create a single element. As another example, the functionality performed by a single element may be performed by two or more elements. In one or more embodiments of the invention, one or more of the elements shown in FIG. 3A may be omitted, repeated, and/or substituted. Accordingly, various embodiments may lack one or more of the features shown. For this reason, embodiments of the invention should not be considered limited to the specific arrangements of elements shown in FIG. 3A.

As shown in FIG. 3A, the system 200 includes a hardware processor 202 operably coupled to a memory 204, a voice activity detector (VAD) 206, an audio line out 208, an audio line in 210, and a wireless transceiver 212. In one or more embodiments, the hardware processor 202, the memory 204, the VAD 206, the wireless transceiver 212, the audio line in 210, and the audio line out 208 may remain in communication over one or more communication busses. Although not depicted in FIG. 3A for purposes of simplicity and clarity, it is understood that, in one or more embodiments, the system 200 may include one or more of a display, a haptic device, a user-operable control (e.g., a button, slide switch, capacitive sensor, touch screen, etc.), and an audio codec for encoding and decoding call audio sent and received via the wireless transceiver 212. The hardware processor 202, the audio line out 208, the audio line in 210, the wireless transceiver 212, and the VAD 206 have been described above in the context of FIG. 2A, and for brevity are not described again in the context of FIG. 3A.

In one or more embodiments, the far-end system 300 is operable to detect when the system 200 has transitioned into and out of discontinuous transmission mode. As described below, when the system 200 is in discontinuous transmission mode, the far-end system 300 will receive zero-payload packets transmitted by the wireless transceiver 212. The far-end system 300 is described below in the context of FIG. 3B.

In one or more embodiments, the system 200 comprises a wireless headset, such as a wireless headset 102 described above in the context of FIG. 1A. In such embodiments, the audio line in 210 includes audio from a microphone configured to pick up speech from a user. Further, in such embodiments, the audio line out 208 outputs audio to one or more speakers configured to render call audio to the user. In such embodiments, the wireless transceiver 212 forms a wireless link with a host device, such as a host device 104 described above in the context of FIG. 1A. Accordingly, as described in further detail below, a call audio stream received using a microphone may be selectively transmitted, via the wireless transceiver 212, to a host device based on a voice activity estimation signal from the VAD 206.

In one or more embodiments, the system 200 may comprise a host device, such as a host device 104 described above in the context of FIG. 1A. In such embodiments, the wireless transceiver 212 forms a wireless link with a wireless headset (i.e., the far-end system 300), such as a wireless headset 102 described above in the context of FIG. 1A. In such embodiments, near-end call audio is received from the wireless headset via the wireless transceiver 212, and output over the audio line out 208 for subsequent delivery over a network to a remote party. Additionally, in such embodiments, the audio line in 210 includes any channel for receiving a call audio stream originating from the remote party. The call audio stream from the remote party may be received over a network. In other words, in such embodiments, call audio originating from a remote party is received at the system 200 via the audio line in 210. As described in further detail below, the call audio stream received over the network may be selectively output, via the wireless transceiver 212, to a wireless headset based on a voice activity estimation signal from the VAD 206.

The memory 204 includes any storage device capable of storing information temporarily or permanently. The memory 204 may include volatile and/or non-volatile memory, and may include more than one type of memory. For example, the memory 204 may include one or more of SDRAM, ROM, and flash memory. In one or more embodiments, the memory 204 may include one or more of a link key, a random number generator, and a device address (e.g., BD_ADDR, etc.). Although the VAD 206 is shown as a separate block, it is understood that, in one or more embodiments, the VAD 206 may be implemented as a routine stored to the memory 204 and executed by the hardware processor 202.

Referring still to FIG. 3A, the far-end system 300 may be configured to automatically determine when the system 200 has switched to discontinuous transmission mode. For example, the far-end system 300 may be configured to recognize that the system 200 has switched to a discontinuous transmission mode in response to the receipt of one or more zero-payload packets from the system 200, which is described in further detail below in the context of FIG. 3B.

Figure 3B:
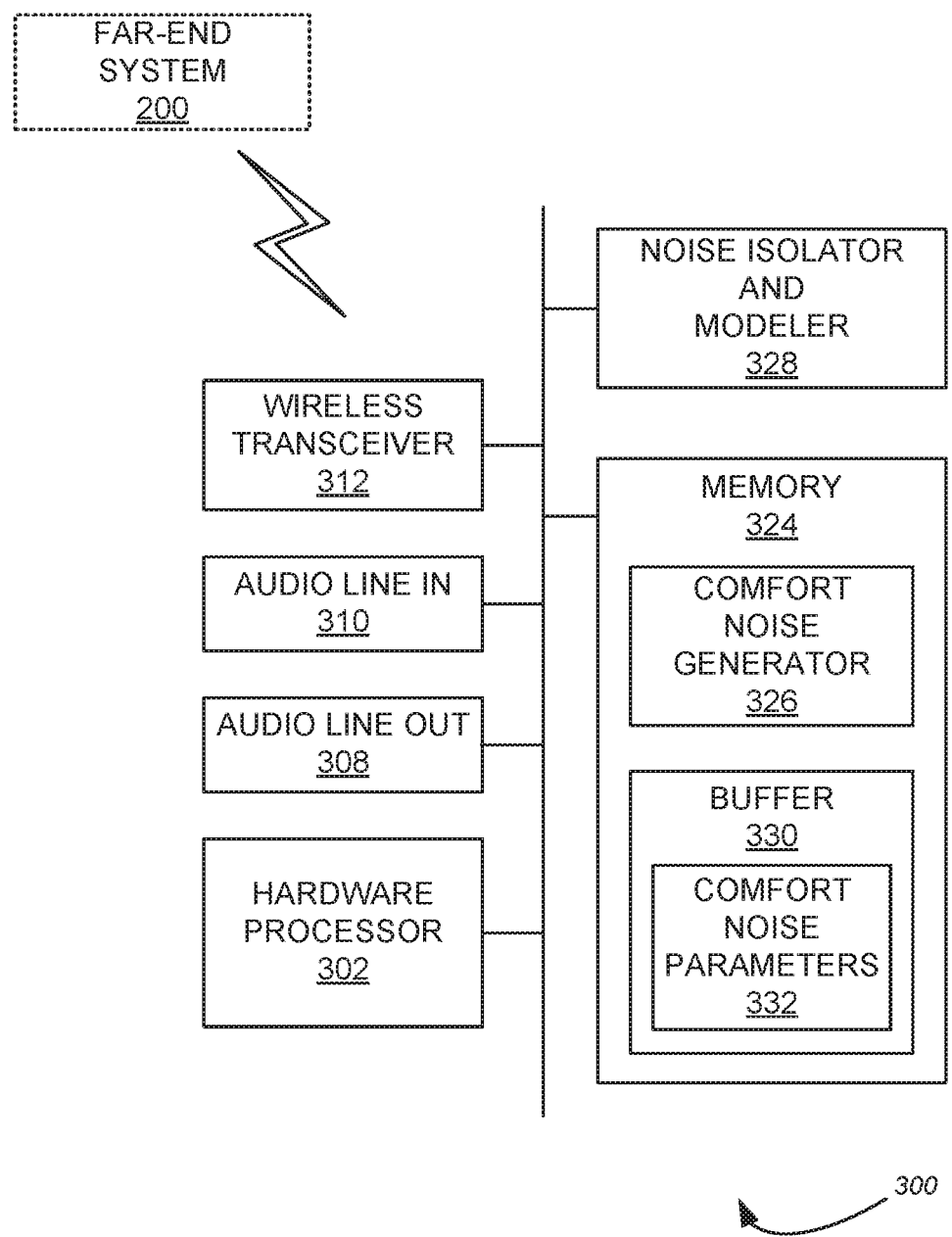
FIG. 3B is a simplified block diagram depicting a system for identifying a transition to discontinuous transmission mode by a far-end system on a short-range packet-based radio link, in accordance with one or more embodiments of the invention.

FIG. 3B depicts a simplified block diagram of a system 300 for identifying a transition to discontinuous transmission mode by a far-end system 200 on a short-range packet-based radio link, according to one or more embodiments. Although the elements of the system 300 are presented in one arrangement, other embodiments may feature other arrangements, and other configurations may be used without departing from the scope of the invention. For example, various elements may be combined to create a single element. As another example, the functionality performed by a single element may be performed by two or more elements. In one or more embodiments of the invention, one or more of the elements shown in FIG. 3B may be omitted, repeated, and/or substituted. Accordingly, various embodiments may lack one or more of the features shown. For this reason, embodiments of the invention should not be considered limited to the specific arrangements of elements shown in FIG. 3B.

As shown in FIG. 3B, the system 300 includes a hardware processor 302 operably coupled to a memory 324, a noise isolator and modeler 328, an audio line out 308, an audio line in 310, and a wireless transceiver 312. In one or more embodiments, the hardware processor 302, the audio line out 308, the audio line in 310, the wireless transceiver 312, the noise isolator and modeler 328, and the memory 324 may remain in communication over one or more communication busses. Although not depicted in FIG. 3B for purposes of simplicity and clarity, it is understood that, in one or more embodiments, the system 300 may include one or more of a display, a haptic device, a user-operable control (e.g., a button, slide switch, capacitive sensor, touch screen, etc.), and an audio codec for encoding and decoding call audio sent and received via the wireless transceiver 312.

The hardware processor 302, the audio line out 308, the audio line in 310, and the wireless transceiver 312 have been described above in the context of FIG. 2B, and for brevity are not described again in the context of FIG. 3B.

In one or more embodiments, the far-end system 200 comprises a remote device operable to transition into and out of discontinuous transmission mode. When the far-end system 200 is in discontinuous transmission mode, the far-end system 200 transmits zero-payload packets for receipt by the wireless transceiver 312. The far-end system 200 is described above in the context of FIG. 3A.

In one or more embodiments, the system 300 comprises a wireless headset, such as a wireless headset 102 described above in the context of FIG. 1A. In such embodiments, the wireless transceiver 312 forms a wireless link with a host device (i.e., the far-end system 200), such as a host device 104 described above in the context of FIG. 1A. Also, in such embodiments, the audio line in 310 receives audio from a microphone configured to pick up speech from a wearing user, and the audio line out 308 outputs audio to one or more speakers configured to render call audio to the user. As described in further detail below, the contents of a call audio stream output on the audio line out 308 may depend on whether the far-end system 200 (i.e., host device) is in discontinuous transmission mode.

In one or more embodiments, the system 300 may comprise a host device, such as a host device 104 described above in the context of FIG. 1A. In such embodiments, the wireless transceiver 312 forms a wireless link with a wireless headset (i.e., the far-end system 200), such as a wireless headset 102 described above in the context of FIG. 1A. In such embodiments, near-end call audio is received from the wireless headset via the wireless transceiver 312, and output over the audio line out 308, for subsequent delivery over a network to a remote party, and the audio line in 310 includes any channel for receiving a call audio stream originating from the remote party. The call audio stream from the remote party may be received over a network, as set forth above. As described in further detail below, a content of a call audio stream output on the audio line out 308 may depend on whether the far-end system 200 (i.e., wireless headset) is in discontinuous transmission mode.

In one or more embodiments, when the far-end system 200 is not in discontinuous transmission mode, and is transmitting voice packets, the voice packets may be decoded for output as audio on the audio line out 308. However, when the far-end system 200 is in discontinuous transmission mode, and is transmitting zero-payload packets, the audio stream on the audio line out 308 may be generated using the comfort noise generator 326, described below.

The memory 324 includes any storage device capable of storing information temporarily or permanently. The memory 324 may include volatile and/or non-volatile memory, and may include more than one type of memory. For example, the memory 324 may include one or more of SDRAM, ROM, and flash memory. In one or more embodiments, the memory 324 may include one or more of a link key, a random number generator, and a device address (e.g., BD_ADDR, etc.). The memory 324 of the system 300 is shown to include a comfort noise generator 326, and a buffer 330. The buffer 330 stores comfort noise parameters 332.

The noise isolator and modeler 328 includes a routine that, when executed by a hardware processor, isolates non-voice signals in voice packets received from the far-end system 200 when the far-end system 200 is not in discontinuous transmission mode. In other words, the noise isolator and modeler 328 may be deactivated upon receipt of one or more zero-payload packets from the far-end system 200. However, while the wireless transceiver 312 receives voice packets from the far-end system 200, the noise isolator and modeler 328 identifies non-speech audio content of the voice packets. In one or more embodiments, the noise isolator and modeler 328 may subtract a speech signal from a stream of incoming voice packets using spectral subtraction of dominant voice frequencies. In one or more embodiments, the noise isolator and modeler 328 may isolate stationary noise within the stream of incoming voice packets. In one or more embodiments, the noise isolator and modeler 328 may isolate high frequency components and/or low frequency components from the voice packets. Other separation techniques may be used that extract background noise from the composite signal containing both background noise and voice. Further, the noise isolator and modeler 328 is operable to characterize the isolated non-voice signals, and store to the buffer 330, as the comfort noise parameters 332, a sequence of records describing the characterized non-voice signals over time. Each record of the comfort noise parameters 332 may include a noise energy level and/or a noise frequency distribution. The buffer 330 may store a moving window of records for a predetermined duration of seconds or minutes. For example, the buffer 330 may include a moving window of records of the comfort noise parameters 332 for a moving window of 5 seconds, 10 seconds, 30 seconds, 5 minutes, 10 minutes, etc. In this way, the system 300 may be equipped to create comfort noise when the far-end system 200 transitions to discontinuous transmission mode.

The comfort noise generator 326 includes a routine that, when executed by the hardware processor 302, is operable to generate comfort noise for output on the audio line out 308. In one or more embodiments, the comfort noise generator 326 generates the comfort noise responsive to the receipt of one or zero-payload packets from the far-end system 200. The comfort noise generator 326 may generate comfort noise until a non-zero-payload packet is again received at the wireless transceiver 312 from the far-end system 200. In other words, once activated, the comfort noise generator 326 may generate comfort noise until a voice packet is received from the far-end system 200.

The comfort noise created by the comfort noise generator 326 is based on one or more records of the comfort noise parameters 332 stored to the buffer 330. For example, the comfort noise generator 326 may average or otherwise combine two or more records of the comfort noise parameters 332 of the buffer 330. Accordingly, responsive to the receipt of one or more zero-payload packets from the far-end system 200, the system 300 is operable to create its own comfort noise using a previously isolated and stored description of noise present with speech in voice packets from the far-end system 200, before the far-end system 200 entered discontinuous transmission mode. Each time the discontinuous transmission mode is exited and voice packets sent by the far-end system 200 are received, the noise isolator and modeler 328 may extract the background noise and update the comfort noise parameters 332.

In this way, the system 300 obviates the need for the far-end system 200 to periodically transmit comfort noise packets while the far-end system 200 is in discontinuous transmission mode. As a result, the far-end system 200 need only send zero-payload packets to the system 300, and the system 300 is able to create comfort noise based on non-speech signal previously received in voice packets from the far-end system 200. Because the far-end system 200 need not periodically send data packets containing comfort noise information, regardless of how short those packets may be, a cumulative radio-on time on of the transceiver of the far-end system 200 is minimized. Minimizing the radio-on time of the transceiver of the far-end system 200, and the duty cycle of its packet transmissions, not only saves power in the transmitter but also decreases the probability of mutual interference. When implemented in numerous devices collocated in an environment, this directly results in an increased number of users that can simultaneously maintain short-range packet-based radio links in the environment without noticeable interference.

FIGS. 4A-4D are timing diagrams illustrating when a master or a slave on a short-range packet-based radio link (i.e., wireless link) has transitioned to discontinuous transmission mode. More specifically, FIGS. 4A-4D depict timing diagrams illustrating the timing of packet transmissions on a short-range packet-based synchronous radio link in which two devices (i.e., a wireless headset and a host device) are each assigned timeslots in which they are permitted to send their respective voice packets. In FIGS. 4A-4D, the transmission and reception of packets on the wireless link are shown from the point of view of a master (i.e., TX). For a slave (i.e., RX) on the wireless link, the transmission and reception actions are reversed. It is contemplated that both a headset and a host device may be either a master or a slave, depending on how the link is set up. For this reason, the below discussion of FIGS. 4A-4D refers only to a slave and a master. The timing diagrams 400, 440 and 470 may be representative of, for example, an Extended Synchronous Connection Oriented (eSCO) Bluetooth link, in which acknowledgement of packet reception may be expected from a receiving device, and the master and slave are permitted to retransmit previously-transmitted packets if acknowledgement is not received within a given window.

Referring now to a first timing diagram 400 of FIG. 4A, timeslots (i.e., slots) are reserved at a constant connection interval spacing, $T_{eSCO}$. A master device (i.e., TX) on the wireless link may be expected to send a new voice packet at the interval of $T_{eSCO}$. As illustrated in FIG. 4A, the master device sends a new voice packet (e.g., TA1, TA2, TA3, etc.) in the first slot of the first frame of each connection interval. Similarly, the master device may expect to receive from a slave device (i.e., RX) on the wireless link a new voice packet at the same interval. As illustrated in FIG. 4A, the slave device sends a new voice packet (e.g., RA1, RA2, RA3, etc.) in the second timeslot of the first frame of each connection interval. In other words, for each first frame of a connection interval, the master transmits a packet to the slave in the first timeslot of the frame and receives a transmission from the slave in the next timeslot of the frame. Also, retransmission opportunities are present for both the master and slave, as illustrated by the timeslots occupied by hashed boxes. The transmission from the slave in the second timeslot may include an acknowledgement (i.e., ACK) of receipt of the packet transmitted by the master in the first timeslot. For example, an acknowledgement of packet TA1 may be included in the packet RA1 transmitted by the slave, an acknowledgement of packet TA2 may be included in the packet RA2 transmitted by the slave, and so on.

The timing diagram 400 of FIG. 4A illustrates a period of three connection intervals on a wireless link in which both the master and slave devices transmit voice packets in their respective timeslots. In other words, for the connection intervals of the timing diagram 400, neither the master nor the slave are in discontinuous transmission mode.

However, referring now to FIG. 4B, a second timing diagram 440 illustrates a period of three connection intervals on the wireless link in which the master device has transitioned to discontinuous transmission mode. For the time period depicted in the second timing diagram 440, an audio stream received at the master (e.g., from a microphone, from a network, etc.), for transmission over the wireless link to the slave, is determined to lack voice-based signals. In other words, the audio stream that the master device should be sending to the slave as voice packets lacks human speech. Accordingly, as depicted in the second timing diagram 440, the master does not send voice packets, and, instead, the master transmits zero-payload packets 441-446 to the slave during the master's transmit timeslots.

As shown in the second timing diagram 440, the first frame begins a first connection interval, the fourth frame begins a second connection interval, and the seventh frame begins a third connection interval. In the case of a Bluetooth link, for example, the zero-payload packets 441-446 may include NULL and/or POLL packets. One or more of the zero-payload packets 442, 444, and 446 may be used to acknowledge reception of a previous packet sent by the slave. In the case of a Bluetooth link, if the master fails to acknowledge receipt of any of the packets RA1, RA2, and RA3, then the slave may retransmit. For example, if the master does not acknowledge receipt of the packet RA1 sent in the first frame, then the slave may retransmit the packet RA1 during the second frame; and, similarly, if the master does not acknowledge receipt of the packet RA2 sent in the fourth frame, then the slave may retransmit the packet RA2 during the fifth frame. Thus, as illustrated in the timing diagram 440, the zero-payload packets 442, 444, and 446 are used to acknowledge receipt of the packets RA1, RA2, and RA3, respectively, sent by the slave in each of the respective previous timeslots. In one or more embodiments, each of the zero-payload packets 442, 444, and 446 may be a NULL packet. If any of the packets RA1, RA2, and RA3 are retransmitted, the master may acknowledge the retransmission using a zero-payload packet. In other words, if the slave retransmits the packet RA1 in second frame, the master may acknowledge the retransmission in the third frame using a zero-payload packet (i.e., hashed boxes in the second and third frames), such as, for example, a NULL packet. If the packet is received successfully and no more retransmissions by the slave occur, the master can abstain from sending zero-payload packets during the remainder of the connection interval $T_{eSCO}$. That is, a master only needs to send a zero-payload packet including ACK information when a packet from the slave arrives.

In one or more embodiments, such as in the case of a Bluetooth link, the first packet transmitted by the master at the start of each connection interval may be a POLL packet. For example, each of the zero-payload packets 441, 443, and 445 may be POLL packets, which require the slave to respond. However, it is contemplated that the zero-payload packet transmitted by the master at the start of each connection interval (e.g., the zero-payload packets 441, 443, and 445) may be a NULL packet because the slave is required to transmit in the second timeslot of each interval.

By way of receiving of any of the zero-payload packets 441-446, the slave may be made aware of the master's transition to discontinuous transmission mode. For example, the slave may determine that the master is in discontinuous transmission mode when it receives the first zero-payload packet 441. In response to receiving any of the zero-payload packets 441-446, the slave may begin generating comfort noise. For example, if the slave had been isolating and modeling noise found in previously received voice packets from the master, the slave may begin generating comfort noise in response to receiving the first zero-payload packet 441, or any zero-payload packet received thereafter. In one or more embodiments, however, the slave may depend on short data packets from the master that contain comfort noise parameters in order to generate comfort noise. Data packets including comfort noise parameters may be received periodically. For example, data packets including comfort noise parameters may be received from the master every 500 milliseconds, 1 second, 3 seconds, etc.

Referring now to FIG. 4C, a third timing diagram 470 illustrates a period of three connection intervals on the wireless link in which the slave device has transitioned to discontinuous transmission mode while the master sends voice packets. For the time period depicted in the timing diagram 470, an audio stream received at the slave (e.g., from a microphone, from a network, etc.), for transmission over the wireless link to the master, is determined to lack voice-based signals. In other words, the audio stream that the slave device should be sending to the master as voice packets lacks human speech. Accordingly, as depicted in the timing diagram 470, the slave does not send voice packets, and, instead, the master receives zero-payload packets 471-473 from the slave during the slave's transmit timeslots. As shown in the timing diagram 470, the first frame begins a first connection interval, the fourth frame begins a second connection interval, and the seventh frame begins a third connection interval.

In the first frame of the first connection interval, the master transmits a voice packet TA1 to the slave. The slave responds to the packet TA1 by transmitting a zero-payload packet 471 to the master. The slave may be required to acknowledge the packet TA1. Accordingly, the zero-payload packet 471 serves to acknowledge receipt of the packet TA1 by the slave. As an option, the zero-payload packet 471 may be of a type that does not require a further response from the master, such as a NULL packet. This interaction repeats at the fourth frame, and again at the seventh frame. However, the master may retransmit one or more of the voice packets TA1, TA2, and TA3 based on acknowledgement information, or the lack thereof, from the slave. For example, if the master fails to receive in the first frame the zero-payload packet 471, then the master may retransmit the voice packet TA1 in the second frame, which is shown as a hashed box. Similarly, if the master fails to receive in the fourth frame the zero-payload packet 472, which serves to acknowledge the voice packet TA2, then the master may retransmit the voice packet TA2 in the fifth frame, which is shown as a hashed box. In response to any retransmitted voice packet from the master, the slave may respond, in the same frame, with a zero-payload packet. For example, as noted above, the slave may respond with a NULL packet. If the packet is received successfully and no more retransmissions by the master occur, the slave can abstain from sending zero-payload packets during the remainder of the connection interval $T_{eSCO}$. That is, a slave only needs to send a zero-payload packet including ACK information when a packet from the master arrives.

By way of receiving any of the zero-payload packets 471-473, the master may be made aware of when the slave transitions to discontinuous transmission mode. For example, the master may determine that the slave is in discontinuous transmission mode when it receives the first zero-payload packet 471, or after it receives from the slave a predetermined number of zero-payload packets (e.g., 3, 10, 15, etc.) with no voice packet therebetween. In response to receiving one or more zero-payload packets from the slave, the master may begin generating comfort noise. In one or more embodiments, if the master had been isolating and modeling noise found in previously received voice packets from the slave, the master may begin generating comfort noise in response to receiving the first zero-payload packet 471, or any zero-payload packet received thereafter. In one or more embodiments, the master may depend on short data packets from the slave that contain comfort noise parameters in order to generate comfort noise. The short data packets may include any type of data packet including comfort noise parameters. Data packets including comfort noise parameters may be received periodically. For example, data packets including comfort noise parameters may be received from the slave every 500 milliseconds, 1 second, 3 seconds, etc.

Since each transmitter has its own VAD to determine whether or not to activate discontinuous transmission mode, a situation may arise where both units (i.e., master and slave) are in discontinuous transmission mode. In this case, zero-payload packets (e.g., NULL and/or POLL packets) are sent in both directions. In response to the reception of zero-payload packets, comfort noise may be generated at both ends. Since the zero-payload packets may be very robust (e.g., POLL and NULL packets contain extensive forward-error-correction coding protection), a very low-duty cycle link may result where two packets are only exchanged in the first frame of the interval, an example of which is shown in FIG. 4D. In particular, as shown in the timing diagram 490 of FIG. 4D, the master transmits a first zero-payload packet 480 to the slave, and receives a second zero-payload packet 483 from the slave, during a first frame. This occurs again in the fourth frame, where the master transmits to the slave a third zero-payload packet 481, and receives a fourth zero-payload packet 484 from the slave; and in the seventh frame, where the master transmits to the slave a fifth zero-payload packet 482, and receives a sixth zero-payload packet 485 from the slave.

Switching the slave and/or the master to a state of discontinuous transmission can significantly reduce the traffic load on the wireless link between the two devices. For example, on a Bluetooth link, POLL packets and NULL packets both have a bit length of 126 bits, and require a radio-on time of 126 microseconds to transmit at a rate of 1 Mb/s. A typical voice packet requires a radio-on time of 400 microseconds to transmit. Thus, when compared to a wireless link on which both devices are transmitting voice packets, a link on which at least one device has switched to discontinuous transmission mode has a significantly reduced traffic load. In addition to a reduced amount of environmental interference, switching to discontinuous transmission mode reduces radio-on time for a device, resulting in lower power consumption.

The systems and methods of discontinuous transmission disclosed herein are not limited to use on wireless links in which transmit opportunities are limited to a predetermined connection interval, frame, and/or timeslot. For example, while the discussion of FIGS. 4A-4D is illustrated above using examples pertaining to Bluetooth Classic, which is defined by 1.25-millisecond duplex frames, each comprising two 625-microsecond timeslots, it is contemplated that the systems and methods of discontinuous transmission described herein may be deployed in the context of other types of short-range packet-based radio links.

As one example, FIGS. 5A-5D depict exemplary timing diagrams 500, 540, 570, and 590 in which a device (i.e., a wireless headset and/or a host device) on a short-range packet-based isochronous radio link defined by connection event windows and sub-events—instead of strict time slotted connection intervals—transitions to a discontinuous transmission mode. In FIGS. 5A-5D, the transmission and reception of packets on the wireless link are shown from the point of view of a master (i.e., TX). For a slave (i.e., RX) on the wireless link, the transmission and reception actions are reversed. It is contemplated that both a headset and a host device may be either a master or a slave, depending on how the link is setup. For this reason, the below discussion of FIGS. 5A-5C refers only to a slave and a master.

In the timing diagrams 500, 540, 570, and 590 of FIGS. 5A, 5B, 5C, and 5D, respectively, a start of a connection event window, $T_{event}$, may be determined by a transmission from a master on the link. As an option, an event window may comprise multiple sub-events. To achieve frequency diversity, each sub-event may use its own carrier frequency. Also, within a sub-event both forward and return packets may be exchanged. In other words, a sub-event is split into a forward slot where a master sends a packet, and a return slot where slave sends a packet. Further, instead of having fixed timeslots for the master and slave, as described above in reference to the timing diagrams 400, 440, 470, and 490 of FIGS. 4A-4D, a new packet from a slave may be sent at a predefined inter-frame spacing measured from the end of the previous packet, $T_{IFS}$. Further, in contrast to the slot reservation technique used for eSCO as described above in reference to the timing diagrams 400, 440, 470, and 490 of FIGS. 4A-4D where slaves may transmit unconditionally, a slave may only transmit when it successfully receives a properly addressed packet from the master.

Referring now to FIG. 5A, a first timing diagram 500 depicts the transmissions on an isochronous radio link defined by connection events and sub-events, where neither the master nor the slave are in discontinuous transmission mode. As illustrated by the timing diagram 500, a master may send a new voice packet at the event window interval of $T_{event}$. The event window interval may be of any suitable duration, such as, for example, between 5-10 ms. As shown in the timing diagram 500, during a first sub-event of a first event window, the master sends a voice packet TA1 to the slave, and after waiting $T_{IFS}$ the slave sends a voice packet RA1 to the master. In the packet RA1 the slave may include an acknowledgement of the packet TA1. Subsequent sub-events of the first event window may allow for retransmission of the packets TA1 and RA1 if acknowledgment is not received from the receiving device. For example, the hashed boxes of the second sub-event and the third sub-event indicate where retransmission may occur for the packets TA1 and RA1. After the third sub-event, a new event window begins, which starts with the master sending a second voice packet TA2 to the slave. Although two retransmission opportunities are shown in each event window of the timing diagrams 500, 540, and 570, it is understood that more or less than two retransmission opportunities may be included in an event window. For example, each event window may include 1, 3, 5, etc. retransmission opportunities. Still referring to the first timing diagram 500, as the master and slave are both illustrated as sending a voice packet in each event window, neither the master nor the slave is in discontinuous transmission mode.

However, referring now to FIG. 5B, a second timing diagram 540 illustrates a period of two event windows on the wireless link in which the master device has transitioned to discontinuous transmission mode. For the time period depicted in the second timing diagram 540, an audio stream received at the master (e.g., from a microphone, from a network, etc.), for transmission over the wireless link to the slave, is determined to lack voice-based signals. In other words, the audio stream that the master device should be sending to the slave as voice packets lacks human speech. Accordingly, as depicted in the second timing diagram 540, the master does not send voice packets, and, instead, the master transmits zero-payload packets 541-544 to the slave. In particular, at the start of a first event window, beginning with the first sub-event, the master transmits the first zero-payload packet 541. Upon receipt of the first zero-payload packet 541, the slave sends voice packet RA1 to the master after waiting $T_{IFS}$. Upon receipt of the voice packet RA1, the master transmits the second zero-payload packet 542, which serves to acknowledge receipt of the voice packet RA1. If RA1 is received correctly and no retransmission follows from the slave, the master may abstain from sending zero-payload packets during the remainder of the event window interval of $T_{event}$.

This process repeats itself in the second event window comprising sub-events 4-6, where the master transmits the third zero-payload packet 543 at the start of the fourth sub-event; and upon receipt of the third zero-payload packet 543, the slave sends voice packet RA2 to the master after waiting $T_{IFS}$. Upon receipt of the voice packet RA2, the master acknowledges receipt of the voice packet RA2 by transmitting the fourth zero-payload packet 544. Failure of the master to send the fourth zero-payload packet 544 to the slave may result retransmissions by the slave.

By way of receiving of any of the zero-payload packets 541-544, the slave may be made aware of the master's transition to discontinuous transmission mode. For example, the slave may determine that the master is in discontinuous transmission mode when it receives one of the zero-payload packets 541 or 543 at an anchor point (i.e., beginning of an event window) of the link. In response to receiving any of the zero-payload packets 541-544, the slave may begin generating comfort noise. For example, if the slave had been isolating and modeling noise found in previously received voice packets from the master, the slave may begin generating comfort noise in response to receiving the first zero-payload packet 541, or any zero-payload packet received thereafter. In one or more embodiments, however, the slave may depend on short data packets from the master that contain comfort noise parameters in order to generate comfort noise. Data packets including comfort noise parameters may be received periodically. For example, data packets including comfort noise parameters may be received from the master every 500 milliseconds, 1 second, 3 seconds, etc.

Referring now to FIG. 5C, a third timing diagram 570 illustrates a period of two event windows on the wireless link in which the slave device has transitioned to discontinuous transmission mode while the master sends voice packets. For the time period depicted in the third timing diagram 570, an audio stream received at the slave (e.g., from a microphone, from a network, etc.), for transmission over the wireless link to the master, is determined to lack voice-based signals. In other words, the audio stream that the slave device should be sending to the master as voice packets lacks human speech. Accordingly, as depicted in the third timing diagram 570, the slave does not send voice packets, and, instead, the master receives from the slave zero-payload packets 571 and 572. If the slave is required to respond to a transmission from the master, then the transmission of the zero-payload packets 571 and 572 may meet such a requirement. As depicted in FIG. 5C, at the start of a first event window beginning with the first sub-event, the master transmits to the slave the voice packet TA1; and at the start of a second event window beginning with the fourth sub-event, the master transmits to the slave the voice packet TA2. Responsive to receiving the first voice packet TA1, the slave waits TTS and then sends the first zero-payload packet 571. The first zero-payload packet 571 serves as receipt acknowledgement of the first voice packet TA1. Similarly, responsive to receiving the second voice packet TA2, the slave waits $T_{IFS}$ and then sends the second zero-payload packet 572. The second zero-payload packet 572 serves to acknowledge receipt of the second voice packet TA2 by the slave. If the voice packet TA1 is received correctly and no retransmission follows from the master, the slave may abstain from sending zero-payload packets during the remainder of the event window interval of $T_{event}$.

By way of receiving any of the zero-payload packets 571-572, the master may be made aware of when the slave transitions to discontinuous transmission mode. For example, the master may determine that the slave is in discontinuous transmission mode when it receives the first zero-payload packet 571, or after it receives from the slave a predetermined number of zero-payload packets (e.g., 3, 10, 15, etc.) with no voice packet therebetween. In response to receiving one or more zero-payload packets from the slave, the master may begin generating comfort noise. In one or more embodiments, if the master had been isolating and modeling noise found in previously received voice packets from the slave, the master may begin generating comfort noise in response to receiving the first zero-payload packet 571, or any zero-payload packet received thereafter. In one or more embodiments, the master may depend on short data packets from the slave that contain comfort noise parameters in order to generate comfort noise. Data packets including comfort noise parameters may be received periodically. For example, data packets including comfort noise parameters may be received from the slave every 500 milliseconds, 1 second, 3, seconds, etc.

It is contemplated that both the master and slave may enter discontinuous transmission mode at the same time. This may happen, for example, when neither party to a call is speaking. In such an event, both master and slave exchange zero-payload packets at the event window rate. Furthermore, the master and/or the slave may generate comfort noise, as described above. Also, in such an event, the master and/or slave may periodically transmit comfort noise packets, so that the other end may generate comfort noise therefrom, as described above. An example of the case where both the master and the slave are in discontinuous transmission mode is shown in FIG. 5D, where zero-payload packets are only exchanged at the beginning of each new connection event. In particular, as shown in the timing diagram 590 of FIG. 5D, the master transmits to the slave a first zero-payload packet 580 at the start of a first event window, beginning with the first sub-event. Upon receipt of the first zero-payload packet 580, the slave sends a second zero-payload packet 582 to the master after waiting $T_{IFS}$. Similarly, the master transmits a third zero-payload packet 581 at the start of a second event window, beginning with the fourth sub-event; and upon receipt of the third zero-payload packet 581, the slave sends a fourth zero-payload packet 583 to the master after waiting $T_{IFS}$.

Using zero-payload packets as an indication that the transmitter is in discontinuous transmission mode allows the receiver to smoothly move from passing voice signals to generating comfort noise and vice versa. In one or more embodiments, each time before discontinuous transmission is enabled or disabled, the transmitter may send a dedicated control message (i.e., using link manager protocol (LMP) using DM packets) to the receiver. In any event, the system may indicate whether discontinuous transmission is supported or not. This can be negotiated by control signaling commands higher up in the communications protocol stack. Negotiation for whether discontinuous transmission is applied can be done either at connection setup (i.e., when the wireless connection is made), or at channel establishment (i.e., when a voice channel is opened over the wireless connection). Whether comfort noise parameters are distilled in the transmitter or in the receiver could be negotiated separately for each direction.

Figure 6:
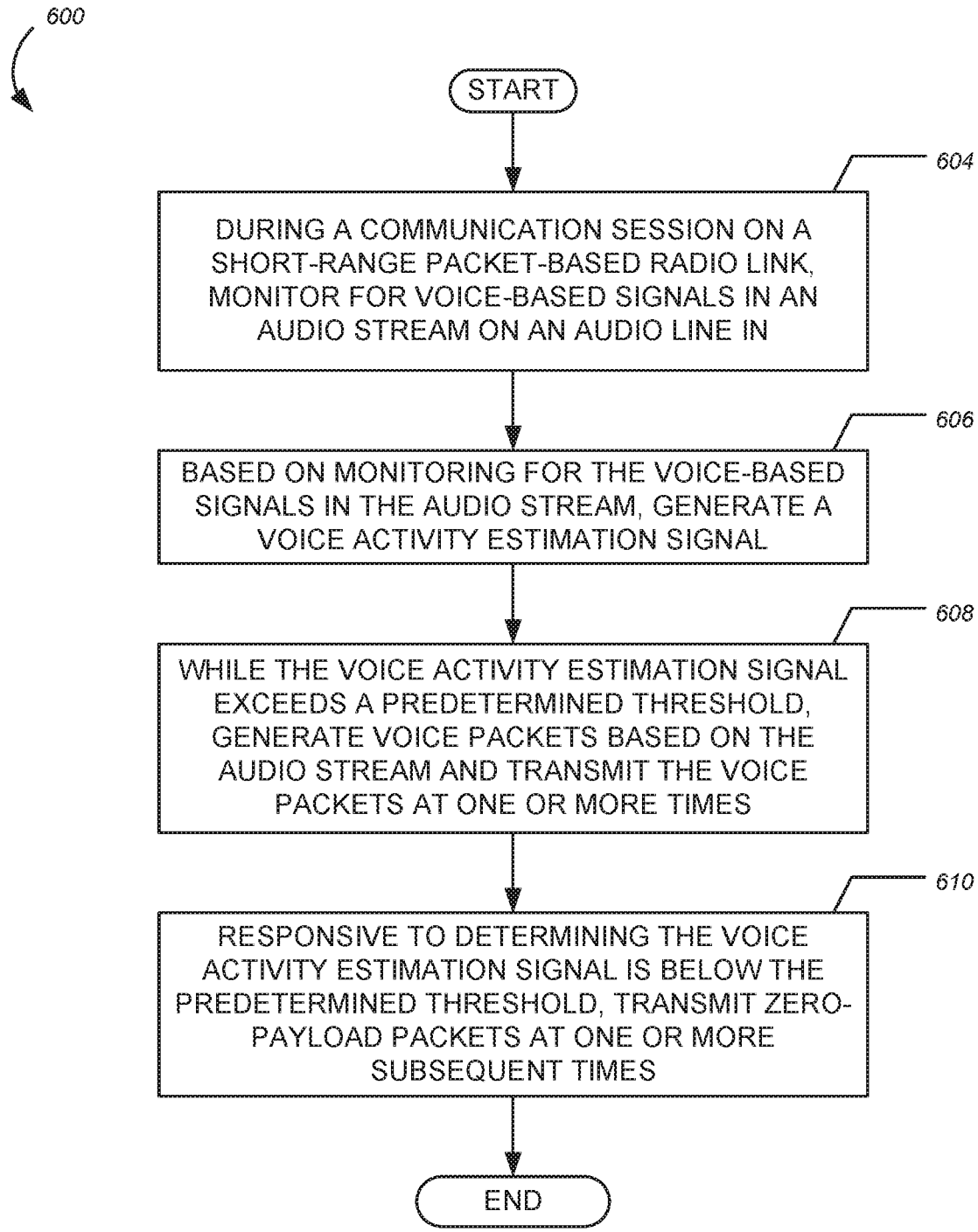
FIG. 6 is a flow diagram depicting a method for discontinuous transmission on a short-range packet-based radio link, in accordance with one or more embodiments of the invention.

FIG. 6 shows a flowchart of a method 600 for discontinuous transmission on a short-range packet-based radio link, in accordance with one or more embodiments of the invention. While the steps of the method 600 are presented and described sequentially, one of ordinary skill in the art will appreciate that some or all of the steps may be executed in a different order, may be combined or omitted, and may be executed in parallel. Furthermore, the steps may be performed actively or passively. For example, some steps may be performed using polling or be interrupt driven in accordance with one or more embodiments of the invention. In one or more embodiments, the method 600 may be carried out by the system 200 or the system 250, described above in reference to FIGS. 3A and 2A, respectively. In other words, the method 600 may be carried out by a wireless headset, such as one of the wireless headsets 102, or by a host device, such as one of the host devices 104, both described above in the context of FIG. 1A.

At step 604, an audio stream on an audio line in is monitored for voice-based signals. The audio line in is monitored for the voice-based signals during a synchronous or isochronous communication session on a short-range packet-based radio link. In one or more embodiments, the audio stream on the audio line in may be sampled and encoded as a series of voice packets that are transmitted to a far-end system, such as a headset (if the method 600 is being carried out by a host device) or host device (if the method 600 is being carried out by a wireless headset). Accordingly, the audio stream on the audio line in may originate from a microphone of a headset, or over a network from a remote party. The communication session may include any bidirectional communication session in which the system performing the method 600 and a far-end system exchange voice packets in a real-time, or near-real-time, manner. The communication session may include, for example, a SCO or eSCO Bluetooth link, or a session in which voice and/or audio packets are exchanged using Bluetooth Low Energy. Further, it is understood that steps 606-610 may be carried out during the communication session on the short-range packet-based radio link Also, at step 606, a voice activity estimation signal is generated, by a voice activity detector, based on monitoring for voice-based signals in the audio stream. The voice activity estimation signal may estimate the likelihood of the presence of human speech in the audio stream received on the audio line in. At step 608, while the voice activity estimation signal exceeds a predetermined threshold, one or more voice packets are generated based on the audio stream and transmitted at one or more times. At step 610, responsive to determining that the voice activity estimation signal is below the predetermined threshold, one or more zero-payload packets are transmitted at one or more subsequent times.

In one or more embodiments, the system performing the method 600 may be allowed to transmit a packet only during certain predetermined times. For example, the one or more times of step 608 may occur during one or more reserved or assigned timeslots of a Bluetooth eSCO link. Accordingly, while the voice activity estimation signal exceeds the predetermined threshold, a first voice packet may be generated and transmitted during a first reserved timeslot, a second voice packet may be generated and transmitted during a second reserved timeslot, a third voice packet may be generated and transmitted during a third reserved timeslot, and so on. Retransmit opportunities may exist between the above-mentioned reserved time slots in order to retransmit voice packets that were received incorrectly. Continuing the above example, the subsequent times may include reserved or assigned timeslots, following those timeslots used at step 608, on the Bluetooth eSCO link. Accordingly, transmitting the zero-payload packets may include transmitting a zero-payload packet at one or more timeslots of one or more connection intervals. For example, a first zero-payload packet may be transmitted during a first timeslot of a first frame of a connection interval; a voice packet may then be received during a second timeslot of the first frame; and a second zero-payload packet may be transmitted during a first timeslot of a next frame, where the second zero-payload packet serves to acknowledge receipt of the voice packet. The next frame may immediately follow the first frame. As an option, the first zero-payload packet may be a POLL packet, which provokes a response from the far-end system sending the voice packet, and the second zero-payload packet may be a NULL packet. Of course, however, the zero-payload packets may include any types of packets without a payload.

In one or more embodiments, the times may occur during one or more sub-events of connection event windows on an isochronous link. For example, while the voice activity estimation signal exceeds the predetermined threshold, a first voice packet may be generated and transmitted at a first anchor point, a second voice packet may be generated and transmitted at a second anchor point, a third voice packet may be generated and transmitted at a third anchor point, and so on. Each of the anchor points may begin a respective event window. Further, the subsequent times may occur during one or more sub-events of subsequent connection event windows, following those sub-events used at step 608, on the isochronous link. Transmitting the zero-payload packets may include transmitting a zero-payload packet during multiple sub-events of a connection event window. For example, a first zero-payload packet may be transmitted during a first sub-event of an event window; a voice packet may then be received after $T_{IFS}$ and during the same sub-event; and a second zero-payload packet may be transmitted during a next sub-event of the event window, where the second zero-payload packet serves to acknowledge receipt of the voice packet. The next sub-event may immediately follow the first sub-event.

In one or more embodiments, the transmission of the zero-payload packets may be periodically interrupted by the transmission of a comfort noise packet, as described above in the context of FIG. 2A. For example, a comfort noise packet may be transmitted every 3 seconds, 5 seconds, 10 seconds, etc., of continuous zero-payload packet transmission. Accordingly, the system performing the method 600 may be operable to model background noise on the audio line in, and store records of comfort noise parameters. As noted above, such records may be created in response to the voice activity estimation signal falling below the predetermined threshold.

Figure 7:
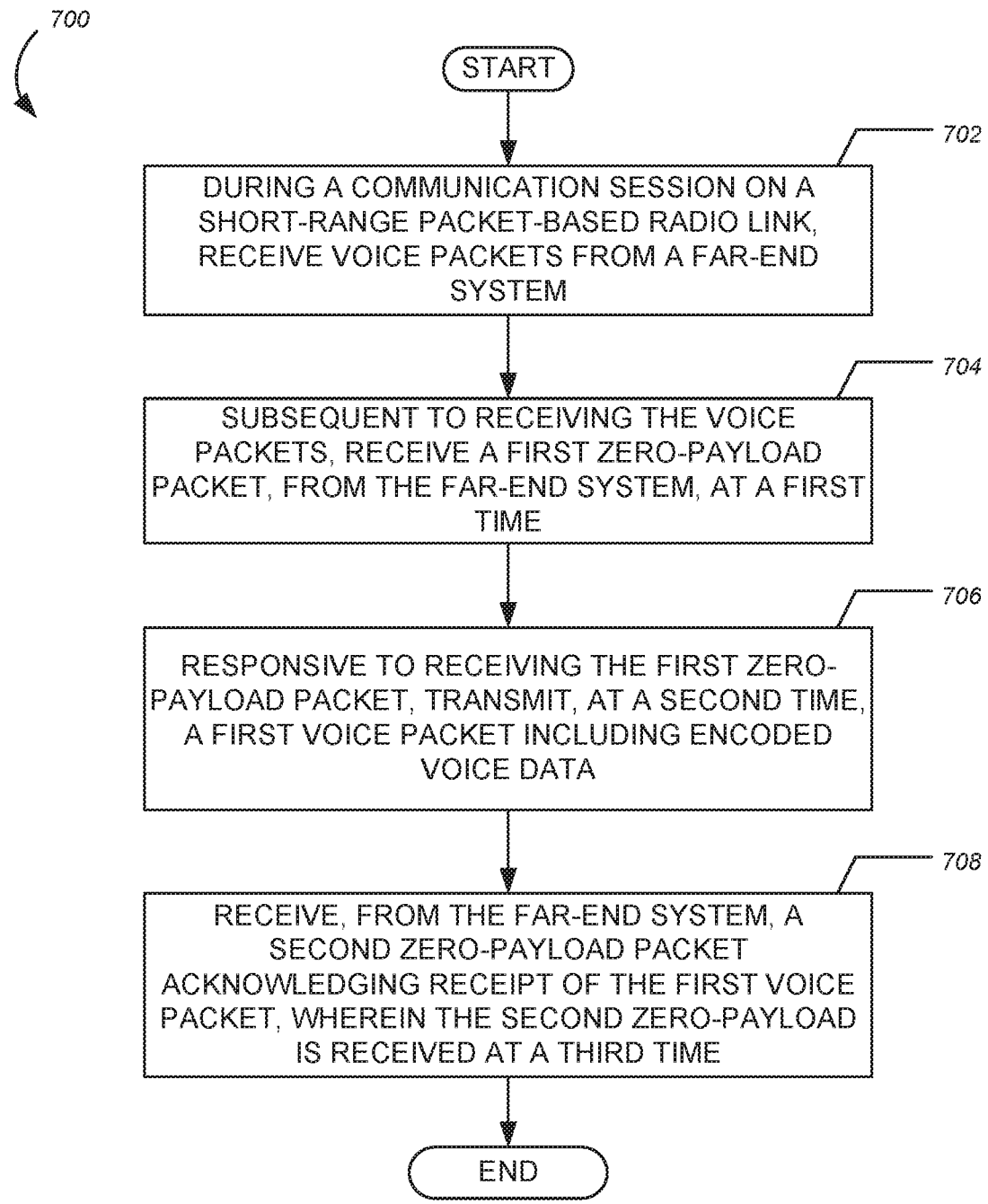
FIG. 7 is a flow diagram depicting a method for discontinuous transmission on a short-range packet-based radio link, in accordance with one or more embodiments of the invention.

FIG. 7 shows a flowchart of a method 700 for discontinuous transmission on a short-range packet-based radio link, in accordance with one or more embodiments of the invention. While the steps of the method 700 are presented and described sequentially, one of ordinary skill in the art will appreciate that some or all of the steps may be executed in a different order, may be combined or omitted, and may be executed in parallel. Furthermore, the steps may be performed actively or passively. For example, some steps may be performed using polling or be interrupt driven in accordance with one or more embodiments of the invention. In one or more embodiments, the method 700 may be carried out by the system 300 or the system 350, described above in reference to FIGS. 3B and 2B, respectively. In other words, the method 700 may be carried out by a wireless headset, such as one of the wireless headsets 102, or by a host device, such as one of the host devices 104, both described above in the context of FIG. 1A.

At step 702, voice packets are received during a synchronous or isochronous communication session on a short-range packet-based radio link. The voice packets may be transmitted from a far-end system, such as a headset (if the method 700 is being carried out by a host device) or host device (if the method 700 is being carried out by a wireless headset). The communication session may include any bidirectional communication session in which the system performing the method 700 and the far-end system transmitting the voice packets exchange voice packets in a real-time, or near-real-time, manner. The communication session may include, for example, a SCO or eSCO Bluetooth link, or a session in which voice and/or audio packets are exchanged using Bluetooth Low Energy. The voice packets received at step 702 may be received over any duration of time, such as a period of seconds or minutes. Further, it is understood that steps 704-708 may be carried out during the communication session on the short-range packet-based radio link At step 704, a first zero-payload packet is received at a first time. When the first zero-payload packet is received from the far-end system, the far-end system may be in discontinuous transmission mode.

In response to receiving the first zero-payload packet at the first time, a first voice packet is transmitted, at step 706, from the system performing the method 700 to the far-end system that sent the first zero-payload packet. The first voice packet is transmitted at a second time. Further, the first voice packet includes encoded voice data. In this way, the far-end system that transmitted the first zero-payload packet may be made aware of the receipt of the first zero-payload packet by the system performing the method 700. The system performing the method 700 may include an audio line in for receiving an audio stream. The audio stream on the audio line in may be sampled and encoded as a series of voice packets that are transmitted to the far-end system, including the first voice packet.

At step 708 a second zero-payload packet is received from the far-end system that sent the first zero-payload packet. The second zero-payload packet is received at a third time. The second zero-payload packet serves to acknowledge receipt, by the far-end system, of the voice packet sent at the second time. In other words, by receiving the second zero-payload packet, the system performing the method 700 is made aware that the first voice packet has been received at the far-end system.

In one or more embodiments, the system performing the method 700, and/or the far-end system, may be allowed to transmit a packet only during certain predetermined times. For example, the one or more times may include one or more reserved or assigned timeslots of a Bluetooth eSCO link. In such an example, the first zero-payload packet from the far-end system may be received during a first timeslot reserved for the far-end system, the first voice packet may be transmitted during a second timeslot reserved for the system performing the method 700, and the second zero-payload packet may be received during a third timeslot reserved for the far-end system. Each of the timeslots may be within the same connection interval. The first timeslot and the second timeslot may occur during the same frame, and the third timeslot may occur during a subsequent frame.

In one or more embodiments, the first zero-payload packet may comprise a POLL packet, and the second zero-payload packet may include a NULL packet. Accordingly, the first voice packet may acknowledge receipt of the POLL packet. Of course, however, the zero-payload packets received from the far-end system may include any types of packets without a payload.

In one or more embodiments, packet transmissions by the system performing the method 700 may only occur after the far-end system has sent a transmission that starts an event window, where each event window includes one or more sub-events, on an isochronous link. Accordingly, the times may occur during one or more sub-events of a connection event window on an isochronous link. For example, receipt of the first zero-payload packet from the far-end system may serve as an anchor point beginning a first sub-event of an event window on the link. The first voice packet may be transmitted during the same first sub-event of the same event window, after waiting $T_{IFS}$. Thus, the first zero-payload packet and first voice packet may be exchanged during the same sub-event. The third time, in which second zero-payload packet is received, may occur during a next sub-event of the event window. The next sub-event may immediately follow the first sub-event.

Following the steps 704-708, additional zero-payload packets may be received from the far-end system. For example, zero-payload packets may be received from the far-end system during subsequent intervals or connection events. As an option, the zero-payload packets received from the far-end system may be periodically interrupted with one or more comfort noise packets. In other words, the system performing the method 700 may receive a comfort noise packet for every 3 seconds, 5 seconds, 10 seconds, etc. of receiving zero-payload packets from the far-end system. In response to receiving such comfort noise packets, the system performing the method 700 may generate comfort noise, as described in the context of the system 350 of FIG. 2B. In one or more embodiments, the system performing the method 700 may be operable to isolate and characterize non-voice signals in voice packets received from the far-end system at step 702, when the far-end system is not in discontinuous transmission mode, as described above the context of the system 300 of FIG. 3B. Accordingly, based on such isolation and characterization, the system performing the method 700 may store comfort noise parameters to a local buffer. Further, responsive to receiving one or more of the zero-payload packets from the far-end system, the system performing the method 700 may be operable to generate and output comfort noise on a local audio line out. Generation of comfort noise may continue until a voice packet is again received from the far-end system.

Figure 8:
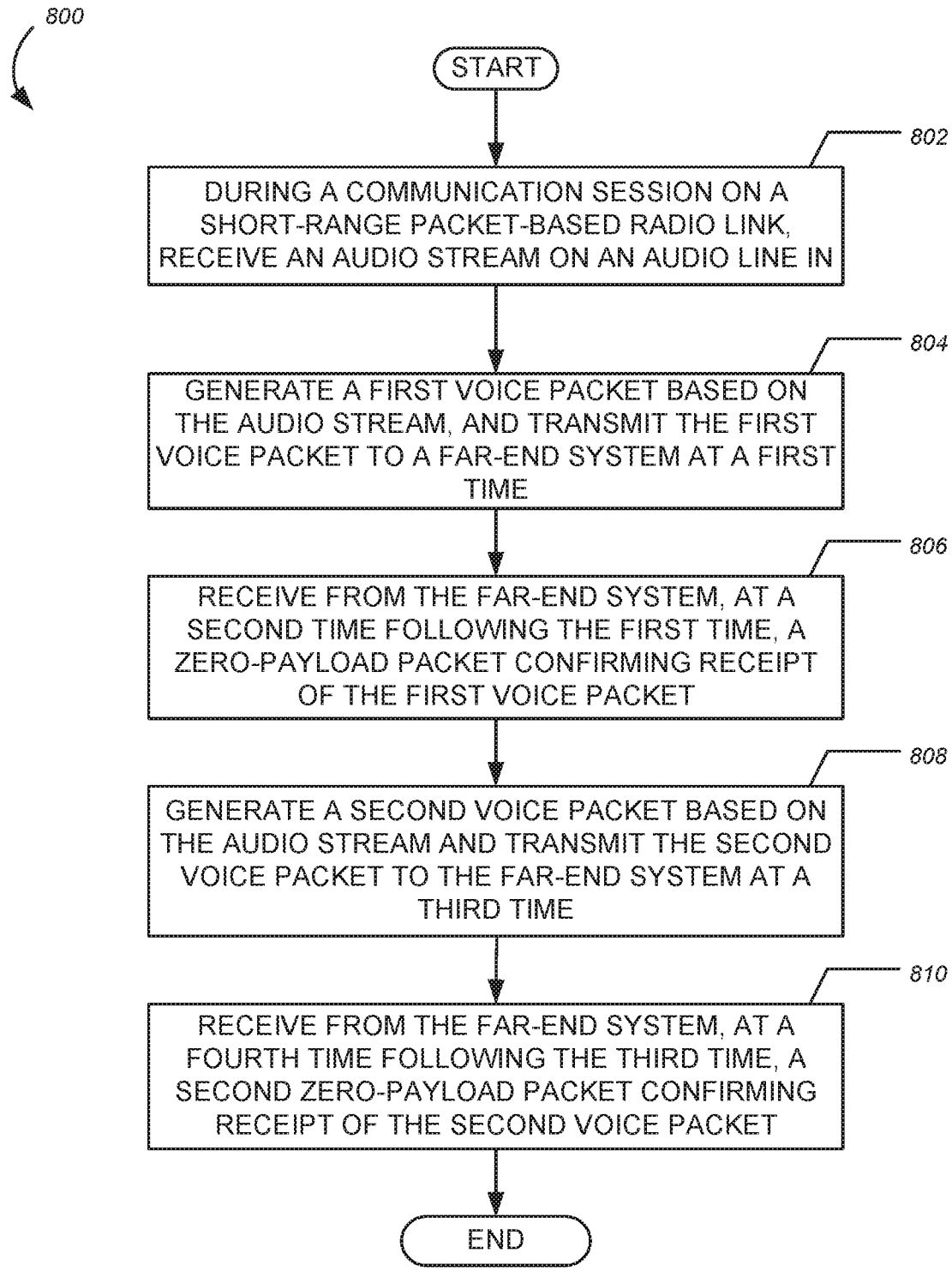
FIG. 8 is a flow diagram depicting a method for discontinuous transmission on a short-range packet-based radio link, in accordance with one or more embodiments of the invention.

FIG. 8 shows a flowchart of a method 800 for discontinuous transmission on a short-range packet-based radio link, in accordance with one or more embodiments of the invention. While the steps of the method 800 are presented and described sequentially, one of ordinary skill in the art will appreciate that some or all of the steps may be executed in a different order, may be combined or omitted, and may be executed in parallel. Furthermore, the steps may be performed actively or passively. For example, some steps may be performed using polling or be interrupt driven in accordance with one or more embodiments of the invention. In one or more embodiments, the method 800 may be carried out by the system 300 or the system 350, described above in reference to FIGS. 3B and 2B, respectively. In other words, the method 800 may be carried out by a wireless headset, such as one of the wireless headsets 102, or by a host device, such as one of the host devices 104, both described above in the context of FIG. 1A.

At step 802, an audio stream is received on an audio line in during a synchronous or isochronous communication session on a short-range packet-based radio link. The audio stream on the audio line is sampled and encoded as a series of voice packets that are transmitted to a far-end system, such as a headset (if the method 800 is being carried out by a host device) or host device (if the method 800 is being carried out by a wireless headset). Accordingly, the audio stream on the audio line in may originate from a microphone of a headset, or over a network from a remote party. The communication session may include any bidirectional communication session in which the system performing the method 800 and a far-end system exchange voice packets in a real-time, or near-real-time, manner. The communication session may include, for example, a SCO or eSCO Bluetooth link, or a session in which voice and/or audio packets are transferred using Bluetooth Low Energy. Further, it is understood that steps 804-810 may be carried out during the communication session on the short-range packet-based radio link At step 804, a first voice packet is generated based on the audio stream, and the first voice packet is transmitted to the far-end system at a first time. At step 806, a first zero-payload packet is received from the far-end system at a second time. The second time follows the first time. The first zero-payload packet serves to confirm receipt, by the far-end system, of the first voice packet. In other words, the system performing the method 800 recognizes, by way of receiving the first zero-payload packet, that the far-end system has received the first voice packet and is in discontinuous transmission mode. This may be because the far-end system is unable to transmit a packet at the second time unless it first receives a transmission from the system performing the method 800, such as the first voice packet transmitted at the first time.

At step 808, a second voice packet is generated based on the audio stream on the audio line in, and the second voice packet is transmitted to the far-end system at a third time. At step 810, a second zero-payload packet is received from the far-end system at a fourth time. The fourth time follows the third time. The second zero-payload packet serves to confirm receipt, by the far-end system, of the second voice packet. Also, the second zero-payload packet indicates that the far-end system is still in discontinuous transmission mode.

In one or more embodiments, the system performing the method 800, and/or the far-end system, may be allowed to transmit a packet only during certain predetermined times. Accordingly, the first, second, third, and fourth times may include one or more reserved or assigned timeslots of a Bluetooth eSCO link. For example, the first voice packet may be transmitted during a first timeslot reserved for the system performing the method 800, and the first zero-payload packet may be received during a second timeslot reserved for the far-end system. Similarly, the second voice packet may be transmitted during a third timeslot reserved for the system performing the method 800, and the second zero-payload packet may be received during a fourth timeslot reserved for the far-end system. The first timeslot and the second timeslot may occur during the same frame of a first connection interval. The third timeslot and the fourth timeslot may occur during a frame of a second connection interval. The second connection interval may immediately follow the first connection interval, or one or more additional connection intervals may occur between the first and second connection intervals. As an option, both the first zero-payload packet and the second zero-payload packet may be NULL packets. Of course, however, the zero-payload packets may include any types of packets without a payload.

In one or more embodiments, packet transmissions by the system performing the method 800 may determine the start of event windows, where each event window includes one or more sub-events, on an isochronous link. Accordingly, the first voice packet may be transmitted at the start of a first event window (i.e., an anchor point), and the first zero-payload packet may be received from the far-end system after $T_{IFS}$. The first voice packet and the first zero-payload packet may be exchanged during the same sub-event of the first event window. Similarly, the second voice packet may be transmitted at the start of a second event window, and the second zero-payload packet may be received from the far-end system after $T_{IFS}$. The second voice packet and the second zero-payload packet may be exchanged during the same sub-event of the second event window. The second event window may immediately follow the first event window, or one or more additional event windows may occur between the first and second event windows.

In one or more embodiments, the system performing the method 800 may receive one or more comfort noise packets from the far-end system. For example, one or more comfort noise packets may be received following the step 810, or between the steps 806 and 808. The comfort noise packets may be periodically transmitted by the far-end system. For example, the system performing the method 800 may receive a comfort noise packet for every 3 seconds, 5 seconds, 10 seconds, etc. of receiving zero-payload packets from the far-end system. In response to receiving such comfort noise packets, the system performing the method 800 may generate comfort noise, as described in the context of the system 350 of FIG. 2B. In one or more embodiments, the system performing the method 800 may be operable to isolate and characterize non-voice signals in voice packets received from the far-end device prior to step 806, when the far-end system is not in discontinuous transmission mode. Accordingly, based on such isolation and characterization, the system performing the method 800 may store comfort noise parameters to a local buffer. Further, responsive to receiving one or more of the zero-payload packets from the far-end system, the system performing the method 800 may be operable to generate and output comfort noise on an audio line out. Generation of comfort noise may continue until a voice packet is again received from the far-end system.

Figure 9:
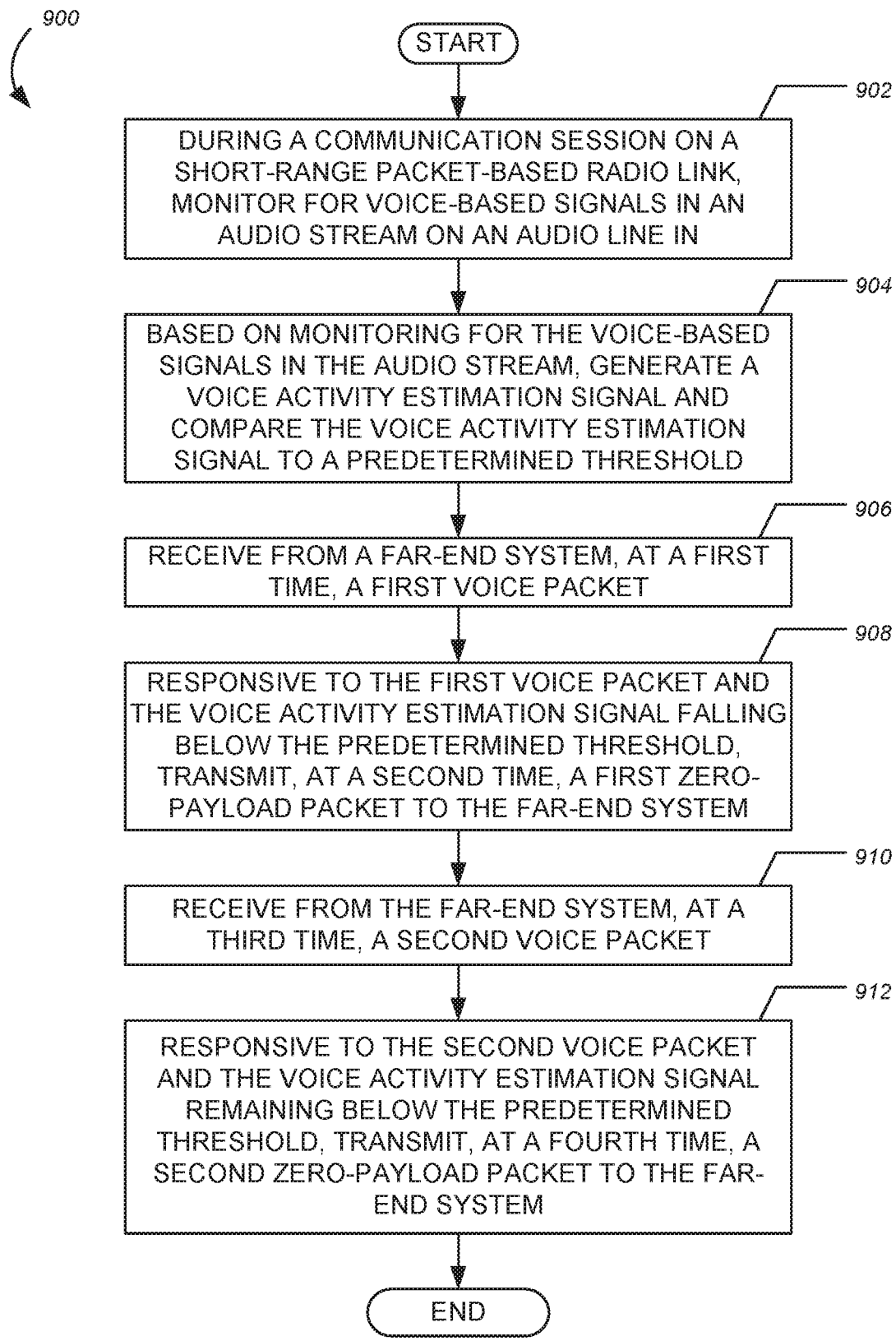
FIG. 9 is a flow diagram depicting a method for discontinuous transmission on a short-range packet-based radio link, in accordance with one or more embodiments of the invention.

FIG. 9 shows a flowchart of a method 900 for discontinuous transmission on a short-range packet-based radio link, in accordance with one or more embodiments of the invention. While the steps of the method 900 are presented and described sequentially, one of ordinary skill in the art will appreciate that some or all of the steps may be executed in a different order, may be combined or omitted, and may be executed in parallel. Furthermore, the steps may be performed actively or passively. For example, some steps may be performed using polling or be interrupt driven in accordance with one or more embodiments of the invention. In one or more embodiments, the method 900 may be carried out by the system 200 or the system 250, described above in reference to FIGS. 3A and 2A, respectively. In other words, the method 900 may be carried out by a wireless headset, such as one of the wireless headsets 102, or by a host device, such as one of the host devices 104, both described above in the context of FIG. 1A.

At step 902, an audio stream on an audio line in is monitored for voice-based signals. The audio line in is monitored for the voice-based signals during a synchronous or isochronous communication session on a short-range packet-based radio link. The communication session may include any bidirectional communication session in which the system performing the method 900 and a far-end system exchange voice packets in a real-time, or near-real-time, manner. The communication session may include, for example, a SCO or eSCO Bluetooth link, or a session in which voice and/or audio packets are exchanged using Bluetooth Low Energy. Further, it is understood that steps 904-912 may be carried out during the communication session on the short-range packet-based radio link.

At step 904, a voice activity estimation signal is generated, by a voice activity detector, based on monitoring for voice-based signals in the audio stream. Also, the voice activity estimation signal is compared to a predetermined threshold. The voice activity estimation signal may estimate the likelihood of the presence of human speech in the audio stream received on the audio line in. When the voice activity estimation signal is above the predetermined threshold, the audio stream on the audio line in is likely to include speech. Accordingly, when the voice activity estimation signal exceeds the predetermined threshold, the audio stream on the audio line in may be sampled and encoded as a series of voice packets that are transmitted to the far-end system, such as a headset (if the method 900 is being carried out by a host device) or host device (if the method 900 is being carried out by a wireless headset). Thus, the audio stream on the audio line in may originate from a microphone of a headset, or over a network from a remote party.

At step 906, a first voice packet is received from the far-end system at a first time. At step 908, responsive to the first voice packet and the voice activity estimation signal falling below the predetermined threshold, a first zero-payload packet is transmitted to the far-end system. The first zero-payload packet is transmitted at a second time. The first zero-payload packet serves to acknowledge receipt, by the system performing the method 900, of the first voice packet. In other words, the far-end system may recognize, by way of receiving the first zero-payload packet, that the system performing the method 900 has received the first voice packet. This may be because the system performing the method 900 is unable to transmit a packet at the second time unless it first receives a transmission from the far-end system, such as the first voice packet received at the first time. Also, the first zero-payload packet indicates that the system performing the method 900 is in discontinuous transmission mode.

At step 910, a second voice packet is received from the far-end system at a third time. At step 912, responsive to the second voice packet and the voice activity estimation signal remaining below the predetermined threshold, a second zero-payload packet is transmitted to the far-end device. The second zero-payload packet is transmitted at a fourth time. The second zero-payload packet serves to acknowledge receipt, by the system performing the method 900, of the second voice packet. In other words, the far-end system may recognize, by way of receiving the second zero-payload packet, that the system performing the method 900 has received the second voice packet. This may be because the system performing the method 900 is unable to transmit a packet at the fourth time unless it first receives a transmission from the far-end system, such as the second voice packet received at the third time. Also, the second zero-payload packet indicates that the system performing the method 900 remains in discontinuous transmission mode.

In one or more embodiments, the system performing the method 900, and/or the far-end system, may be allowed to transmit a packet only during certain predetermined times. Accordingly, the first, second, third, and fourth times may include one or more reserved or assigned timeslots of a Bluetooth eSCO link. For example, the first voice packet may be received during a first timeslot reserved for the far-end system, and the first zero-payload packet may be transmitted during a second timeslot reserved for the system performing the method 900. Similarly, the second voice packet may be received during a third timeslot reserved for the far-end system, and the second zero-payload packet may be transmitted during a fourth timeslot reserved for the system performing the method 900. The first timeslot and the second timeslot may occur during the same frame of a first connection interval. The third timeslot and the fourth timeslot may occur during a frame of a second connection interval. The second connection interval may immediately follow the first connection interval, or one or more additional connection intervals may occur between the first and second connection intervals. As an option, both the first zero-payload packet and the second zero-payload packet may be NULL packets. Of course, however, the zero-payload packets may include any types of packets without a payload.

In one or more embodiments, packet transmissions by the far-end system may determine the start of event windows, where each event window includes one or more sub-events, on an isochronous link. Accordingly, the first voice packet may be received at the start of a first event window (i.e., an anchor point), and the first zero-payload packet may be transmitted from the system performing the method 900 after $T_{IFS}$. The first voice packet and the first zero-payload packet may be exchanged during the same sub-event of the first event window. Similarly, the second voice packet may be received at the start of a second event window, and the second zero-payload packet may be transmitted by the system performing the method 900 after $T_{IFS}$. The second voice packet and the second zero-payload packet may be exchanged during the same sub-event of the second event window. The second event window may immediately follow the first event window, or one or more additional event windows may occur between the first and second event windows.

In one or more embodiments, the transmission of the zero-payload packets may be periodically interrupted by the transmission of a comfort noise packet, as described above in the context of FIG. 2A. For example, the system performing the method 900 may transmit a comfort noise packet every 3 seconds, 5 seconds, 10 seconds, etc., of continuous zero-payload packet transmission. Accordingly, the system performing the method 900 may be operable to model background noise on the audio line in, and store records of comfort noise parameters. As noted above, such records may be created in response to the voice activity estimation signal falling below the predetermined threshold.

In one or more embodiment, in parallel to sending voice packets over a synchronous or isochronous channel, like (e)SCO, comfort noise packets may be sent over an asynchronous channel, like ACL. When the connection enters discontinuous transmission mode, the recipient may then use the comfort noise information received in the past to locally generate comfort noise, giving the user the impression that the connection is not broken.

Figure 10:
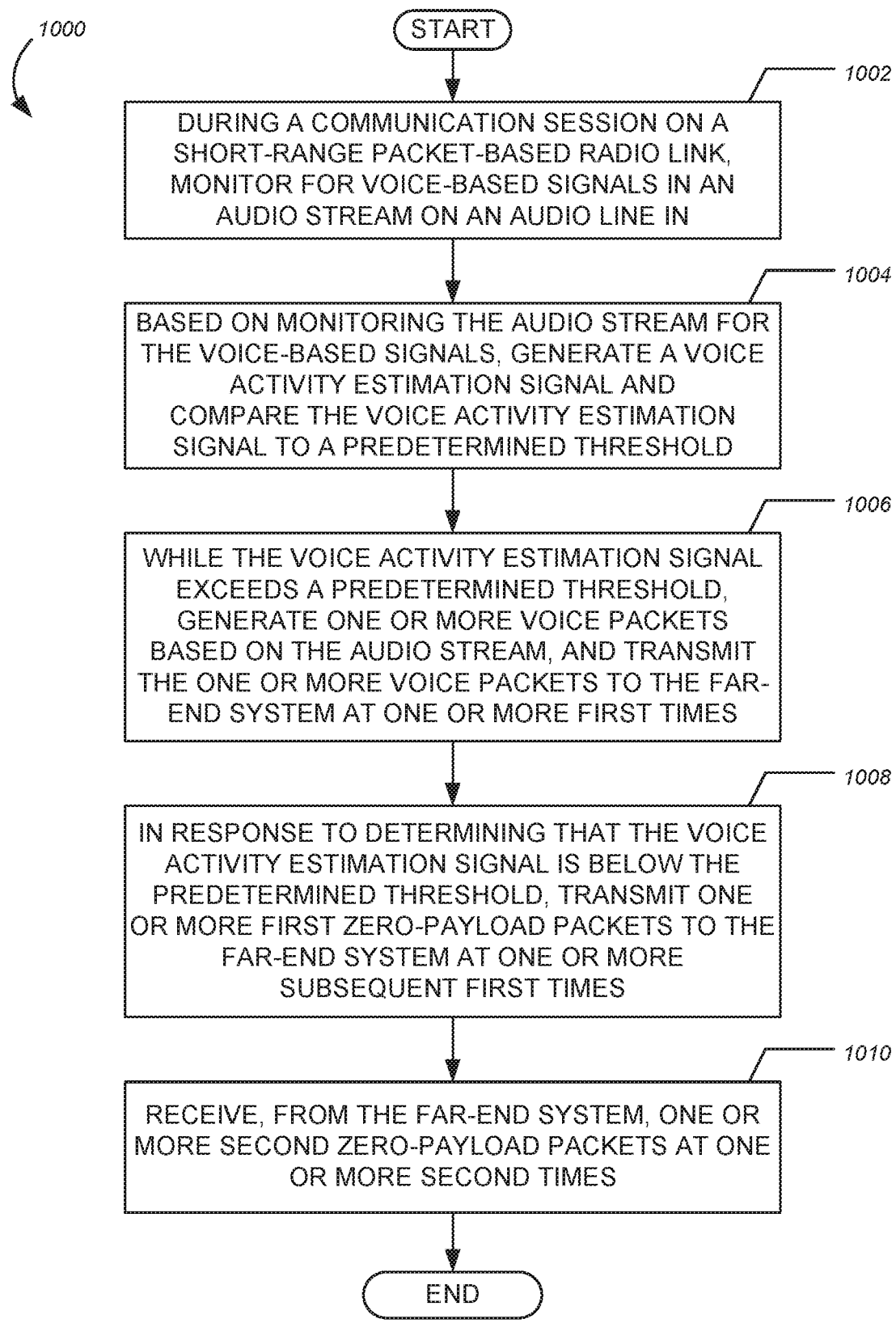
FIG. 10 is a flow diagram depicting a method for discontinuous transmission on a short-range packet-based radio link, in accordance with one or more embodiments of the invention.

FIG. 10 shows a flowchart of a method 1000 for discontinuous transmission on a short-range packet-based radio link, in accordance with one or more embodiments of the invention. While the steps of the method 1000 are presented and described sequentially, one of ordinary skill in the art will appreciate that some or all of the steps may be executed in a different order, may be combined or omitted, and may be executed in parallel. Furthermore, the steps may be performed actively or passively. For example, some steps may be performed using polling or be interrupt driven in accordance with one or more embodiments of the invention. In one or more embodiments, the method 1000 may be carried out by the system 200 or the system 250, described above in reference to FIGS. 3A and 2A, respectively. In other words, the method 1000 may be carried out by a wireless headset, such as one of the wireless headsets 102, or by a host device, such as one of the host devices 104, both described above in the context of FIG. 1A.

At step 1002, an audio stream on an audio line in is monitored for voice-based signals. The audio line in is monitored for the voice-based signals during a synchronous or isochronous communication session on a short-range packet-based radio link. The communication session may include any bidirectional communication session in which the system carrying out the method 1000 and a far-end system exchange voice packets in a real-time, or near-real-time, manner. The communication session may include, for example, a SCO or eSCO Bluetooth link, or a session in which voice and/or audio packets are exchanged using Bluetooth Low Energy. Further, it is understood that steps 1004-1010 may be carried out during the communication session on the short-range packet-based radio link.

At step 1004, a voice activity estimation signal is generated, by a voice activity detector, based on monitoring for voice-based signals in the audio stream. Also, the voice activity estimation signal is compared to a predetermined threshold. The voice activity estimation signal may estimate the likelihood of the presence of human speech in the audio stream received on the audio line in. When the voice activity estimation signal is above the predetermined threshold, the audio stream on the audio line in is likely to include speech. Accordingly, when the voice activity estimation signal exceeds the predetermined threshold, the audio stream on the audio line in may be sampled and encoded as a series of voice packets that are transmitted to the far-end system, such as a headset (if the method 1000 is being carried out by a host device) or host device (if the method 1000 is being carried out by a wireless headset). Thus, the audio stream on the audio line in may originate from a microphone of a headset, or over a network from a remote party.

At step 1006, while the voice activity estimation signal exceeds the predetermined threshold, one or more voice packets are generated based on the audio stream and transmitted at one or more first times.

In one or more embodiments, the system performing the method 1000 may be allowed to transmit a packet only during certain predetermined times, which comprise the one or more first times. For example, the one or more first times of step 1006 may occur during one or more reserved or assigned timeslots of a Bluetooth eSCO link. Accordingly, while the voice activity estimation signal exceeds the predetermined threshold, a first voice packet may be generated and transmitted during a first reserved timeslot, a second voice packet may be generated and transmitted during a second reserved timeslot, a third voice packet may be generated and transmitted during a third reserved timeslot, and so on. Retransmit opportunities may exist between the above-mentioned reserved time slots in order to retransmit voice packets that were received incorrectly.

In one or more embodiments, the first times may occur during one or more sub-events of connection event windows on an isochronous link. Moreover, in such embodiments, packet transmissions by the system carrying out the method 1000 may determine the start of event windows, where each event window includes one or more sub-events, on the isochronous link. Accordingly, while the voice activity estimation signal exceeds the predetermined threshold, the system performing the method 1000 may transmit voice packets at anchor points on the link. Each of the anchor points may begin a respective event window.

At step 1008, responsive to determining that the voice activity estimation signal is below the predetermined threshold, one or more zero-payload packets are transmitted to the far-end system at one or more subsequent first times. Continuing one of the examples above, the subsequent first times may include reserved or assigned timeslots, following those timeslots used for transmission at step 1006, on the Bluetooth eSCO link. Accordingly, transmitting the zero-payload packets at the subsequent first times may include transmitting a zero-payload packet at one or more assigned timeslots of one or more connection intervals. Continuing another of the examples above, the subsequent first times may occur during one or more sub-events of subsequent connection event windows, following those sub-events used at step 1006, on an isochronous link. Accordingly, the first zero-payload packets may be transmitted at anchor points on an isochronous link.

Further, at step 1010, one or more second zero-payload packets are received from the far-end system at one or more second times. Each of the second times follows a corresponding one of the subsequent first times, such that each of the second zero-payload packets is received from the far-end system following the transmission of one of the first zero-payload packets to the far-end system. For example, a first zero-payload packet may be transmitted during a first timeslot of a first frame, and then a corresponding second zero-payload packet may be received during a second timeslot of the first frame. Then, another first zero-payload packet may be transmitted during a first timeslot of a next frame, and a corresponding second zero-payload packet may be received during a second timeslot of the next frame, and so on. As another example, a first zero-payload packet may be transmitted at an anchor point on an isochronous link, and after $T_{IFS}$ a corresponding second zero-payload packet may be received from the far-end system.

The exchange of zero-payload packets between the system carrying out the method 1000 and the far-end system may continue until at least one of the systems exits discontinuous transmission mode. The zero-payload packets may include POLL and/or NULL packets. Of course, however, the zero-payload packets may include any types of packets without a payload.

In one or more embodiments, the transmission or receipt of the zero-payload packets may be periodically interrupted by the transmission or receipt, respectively, of a comfort noise packet, as described above.

Figure 11:
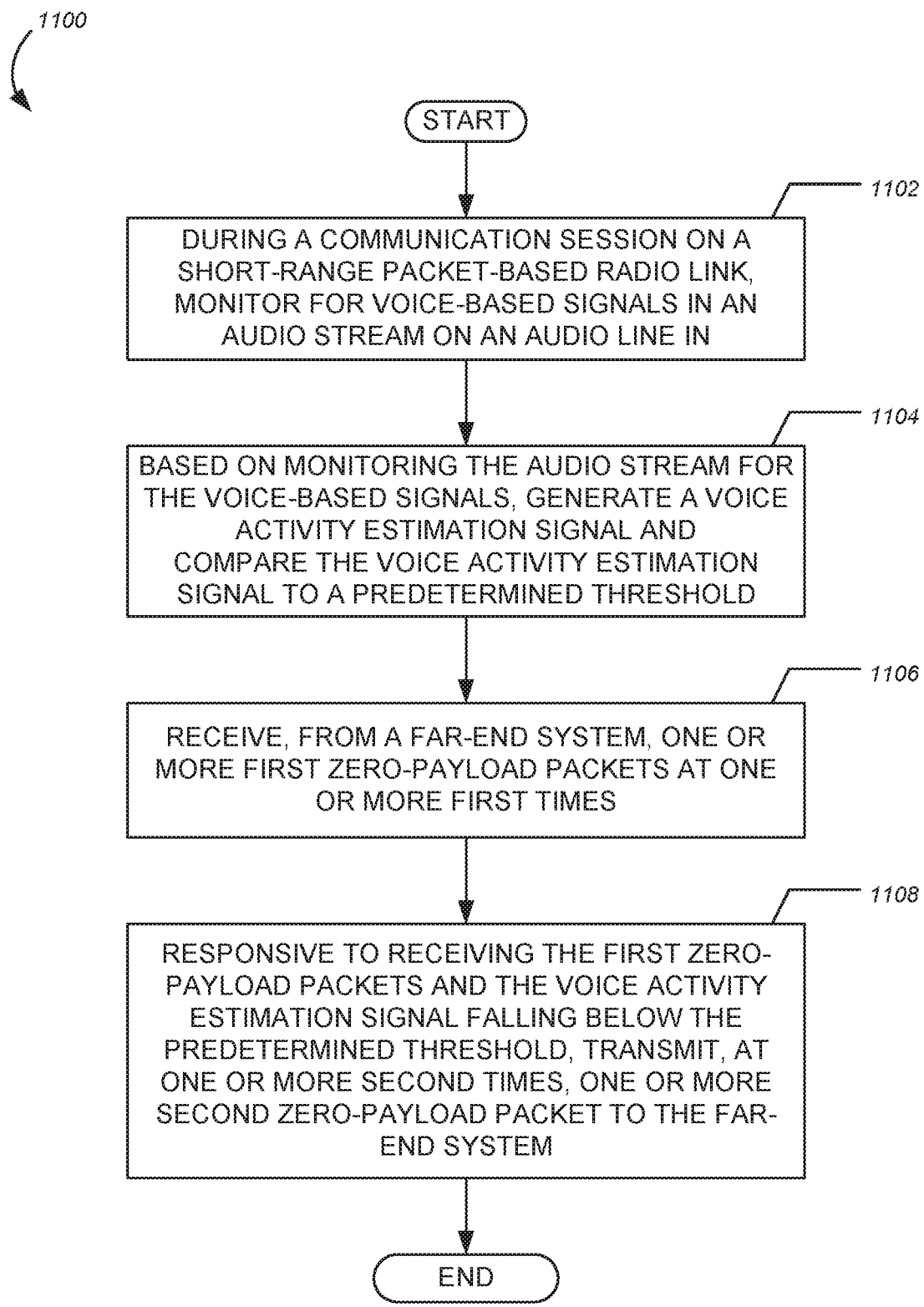
FIG. 11 is a flow diagram depicting a method for discontinuous transmission on a short-range packet-based radio link, in accordance with one or more embodiments of the invention.

FIG. 11 shows a flowchart of a method 1100 for discontinuous transmission on a short-range packet-based radio link, in accordance with one or more embodiments of the invention. While the steps of the method 1100 are presented and described sequentially, one of ordinary skill in the art will appreciate that some or all of the steps may be executed in a different order, may be combined or omitted, and may be executed in parallel. Furthermore, the steps may be performed actively or passively. For example, some steps may be performed using polling or be interrupt driven in accordance with one or more embodiments of the invention. In one or more embodiments, the method 1100 may be carried out by the system 300 or the system 350, described above in reference to FIGS. 3B and 2B, respectively. In other words, the method 1100 may be carried out by a wireless headset, such as one of the wireless headsets 102, or by a host device, such as one of the host devices 104, both described above in the context of FIG. 1A.

At step 1102, an audio stream on an audio line in is monitored for voice-based signals. The audio line in is monitored for the voice-based signals during a synchronous or isochronous communication session on a short-range packet-based radio link. The communication session may include any bidirectional communication session in which the system performing the method 1100 and a far-end system exchange voice packets in a real-time, or near-real-time, manner. The communication session may include, for example, a SCO or eSCO Bluetooth link, or a session in which voice and/or audio packets are exchanged using Bluetooth Low Energy. Further, it is understood that steps 1104-1108 may be carried out during the communication session on the short-range packet-based radio link.

At step 1104, a voice activity estimation signal is generated, by a voice activity detector, based on monitoring for voice-based signals in the audio stream. Also, the voice activity estimation signal is compared to a predetermined threshold. The voice activity estimation signal may estimate the likelihood of the presence of human speech in the audio stream received on the audio line in. When the voice activity estimation signal is above the predetermined threshold, the audio stream on the audio line in is likely to include speech. Accordingly, when the voice activity estimation signal exceeds the predetermined threshold, the audio stream on the audio line in may be sampled and encoded as a series of voice packets that are transmitted to the far-end system, such as a headset (if the method 1100 is being carried out by a host device) or host device (if the method 1100 is being carried out by a wireless headset). Thus, the audio stream on the audio line in may originate from a microphone of a headset, or over a network from a remote party.

At step 1106, one or more first zero-payload packets are received, at one or more first times, from the far-end system. Also, at step 1108, responsive to receiving the first zero-payload packets and the voice activity estimation signal falling below the predetermined threshold, one or more second zero-payload packets are transmitted to the far-end system. The second zero-payload packets are transmitted to the far-end system at one or more second times. In one or more embodiments, the system performing the method 1100 may receive packets from the far-end system during certain predetermined times, and may be allowed to transmit packets to the far-end system only during certain predetermined times. Accordingly, the predetermined times during which the system performing the method 1100 receives packets comprises the one or more first times, and the predetermined times during which the system performing the method 1100 transmits packets comprises the one or more second times. Each of the second times follows a corresponding one of the first times, such that each of the second zero-payload packets is transmitted following the receipt of a corresponding first zero-payload packet from the far-end system.

In one or more embodiments, the one or more first times of step 1106 may include one or more reserved or assigned timeslots of a Bluetooth eSCO link. Accordingly, the first zero-payload packets may be received during timeslots reserved for the far-end system. Further, the second zero-payload packets may be transmitted during timeslots reserved for the system carrying out the method 1100. In other words, the far-end system and the system performing the method 1100 may each transmit and receive a zero-payload packet during a given connection interval. For example, a first zero-payload packet may be received during a first timeslot of a first frame, and then a corresponding second zero-payload packet may be transmitted during a second timeslot of the first frame. Then, another first zero-payload packet may be received during a first timeslot of a next frame, and a corresponding second zero-payload packet may be transmitted during a second timeslot of the next frame, and so on.

In one or more embodiments, the receipt of the first zero-payload packets at step 1106 may designate anchor points on an isochronous link. In other words, the one or more first times of step 1106 may indicate the start of event windows, where each event window includes one or more sub-events, on an isochronous link. Accordingly, the one or more first zero-payload packets may be received during one or more different events on the isochronous link. Further, following the receipt of each of the first zero-payload packets, the system carrying out the method 1100 may wait $T_{IFS}$ before sending a corresponding second zero-payload packet to the far-end system.

The exchange of zero-payload packets between the system carrying out the method 1100 and the far-end system may continue until at least one of the systems exits discontinuous transmission mode. The zero-payload packets may include any types of packets without a payload.

In one or more embodiments, the transmission or receipt of the zero-payload packets may be periodically interrupted by the transmission or receipt, respectively, of a comfort noise packet, as described above.

Various embodiments of the present disclosure can be implemented in digital electronic circuitry, or in computer hardware, firmware, software, or in combinations thereof. Embodiments of the present disclosure can be implemented in a computer program product tangibly embodied in a computer-readable storage device for execution by a programmable processor. The described processes can be performed by a programmable processor executing a program of instructions to perform functions by operating on input data and generating output. Embodiments of the present disclosure can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, processors receive instructions and data from a read-only memory and/or a random access memory. Generally, a computer includes one or more mass storage devices for storing data files. Such devices include magnetic disks, such as internal hard disks and removable disks, magneto-optical disks; optical disks, and solid-state disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits). As used herein, the term "module" may refer to any of the above implementations.

A number of implementations have been described. Nevertheless, various modifications may be made without departing from the scope of the disclosure. Accordingly, other implementations are within the scope of the following claims.

What is claimed is:

1. A method, comprising:
   during an isochronous communication session of a communication master with a far-end system operating as a communication slave on a short-range packet-based radio link, monitoring for voice-based signals in an audio stream received on an audio line in,
      wherein the isochronous communication session comprises a plurality of event windows, the plurality of event windows comprising a first event window;
   based on monitoring the audio stream for the voice-based signals, generating a voice activity estimation signal;
   while the voice activity estimation signal exceeds a predetermined threshold, generating one or more voice packets based on the audio stream, and transmitting the one or more voice packets to the far-end system at one or more times; and
   in response to determining that the voice activity estimation signal is below the predetermined threshold:
      transmitting a first zero-payload packet to the communication slave in a first subevent of the first event window,
      receiving, in response to the first zero-payload packet, a voice packet from the communication slave in the first subevent of the first event window, and
      acknowledging the voice packet by transmitting a second zero-payload packet to the communication slave in a second subevent of the first event window.

2. The method of claim 1, wherein the short-range packet-based radio link includes a Bluetooth link.

3. The method of claim 1, comprising transmitting to the far-end system at least one packet including comfort noise parameters.

4. The method of claim 1, comprising, while the voice activity estimation signal exceeds the predetermined threshold, extracting from the audio stream comfort noise parameters.

5. The method of claim 1, wherein the audio stream on the audio line in originates from a microphone.

6. The method of claim 1,
   wherein the plurality of event windows further comprises a second event window, and
   wherein the method further comprises, in response to determining that the voice activity estimation signal is below the predetermined threshold:
      transmitting a third zero-payload packet to the communication slave in a first subevent of the second event window, and
      receiving, in response to the third zero-payload packet, a fourth zero-payload packet from the communication slave in the first subevent of the second event window.

7. The method of claim 1,
   wherein the plurality of event windows further comprises a second event window, and
   wherein the method further comprises, in response to determining that the voice activity estimation signal is above the predetermined threshold:
      generating a second voice packet based on the audio stream, transmitting the second voice packet to the communication slave in a first subevent of the second event window, and receiving, in response to the second voice packet, a third zero-payload packet from the communication slave in the first subevent of the second event window.

8. A method, comprising:

during an isochronous communication session of a communication slave with a far-end system operating as a communication master on a short-range packet-based radio link:

receiving a first zero-payload packet from the communication master in a first subevent of a first event window of the isochronous communication session;

receiving an audio stream on an audio line in;

generating a voice packet based on the audio stream;

transmitting, in response to the first zero-payload packet, the voice packet to the communication master in the first subevent of the first event window;

receiving a second zero-payload packet from the communication master in a second subevent of the first event window, the second zero-payload packet acknowledging the voice packet;

monitoring for voice-based signals in the audio stream;

based on monitoring the audio stream for the voice-based signals, generating a voice activity estimation signal;

receiving a third zero-payload packet from the communication master in a first subevent of a second event window of the isochronous communication session; and in response to determining that the voice activity estimation signal is below a predetermined threshold:

transmitting, in response to the third zero-payload packet, a fourth zero-payload packet to the communication master in the first subevent of the second event window.

9. The method of claim 8, further comprising generating comfort noise in response to receiving the first zero-payload packet.

10. The method of claim 8, further comprising receiving from the far-end system at least one packet including comfort noise parameters.

11. The method of claim 8, wherein the audio stream on the audio line in originates from a microphone.

12. The method of claim 8, wherein the short-range packet-based radio link includes a Bluetooth link.

13. A method, comprising:

during an isochronous communication session of a communication slave with a far-end system operating as a communication master on a short-range packet-based radio link:

receiving a first zero-payload packet from the communication master in a first subevent of a first event window of the isochronous communication session;

receiving an audio stream on an audio line in;

generating a voice packet based on the audio stream;

transmitting, in response to the first zero-payload packet, the voice packet to the communication master in the first subevent of the first event window;

receiving a second zero-payload packet from the communication master in a second subevent of the first event window, the second zero-payload packet acknowledging the voice packet;

monitoring for voice-based signals in the audio stream;

based on monitoring the audio stream for the voice-based signals, generating a voice activity estimation signal;

receiving a second voice packet from the communication master in a first subevent of a second event window of the isochronous communication session;

in response to determining that the voice activity estimation signal is below a predetermined threshold:

transmitting, in response to the second voice packet, a third zero-payload packet to the communication master in the first subevent of the second event window.

14. The method of claim 13, further comprising generating comfort noise in response to receiving the first zero-payload packet.

15. The method of claim 13, further comprising receiving from the far-end system at least one packet including comfort noise parameters.

16. The method of claim 13, wherein the audio stream on the audio line in originates from a microphone.

17. The method of claim 13, wherein the short-range packet-based radio link includes a Bluetooth link.

* * * * *